(12) United States Patent
Djordjevic et al.

(10) Patent No.: US 10,447,777 B1
(45) Date of Patent: Oct. 15, 2019

(54) METHOD AND SYSTEM FOR PROVIDING A DYNAMICALLY UPDATED EXPERTISE AND CONTEXT BASED PEER-TO-PEER CUSTOMER SUPPORT SYSTEM WITHIN A SOFTWARE APPLICATION

(71) Applicant: Intuit Inc., Mountain View, CA (US)

(72) Inventors: Aleksandra Djordjevic, Plano, TX (US); Jorge R. Olavarrieta, Plano, TX (US)

(73) Assignee: Intuit Inc., Mountain View, CA (US)

( * ) Notice: Subject to any disclaimer, the term of this patent is extended or adjusted under 35 U.S.C. 154(b) by 346 days.

(21) Appl. No.: 14/788,590

(22) Filed: Jun. 30, 2015

(51) Int. Cl.
*H04L 29/08* (2006.01)
*G06Q 50/00* (2012.01)

(52) U.S. Cl.
CPC ........... *H04L 67/104* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 5,471,382 A | 11/1995 | Tallman et al. | |
| 5,519,608 A | 5/1996 | Kupiec | |
| 6,147,975 A | 11/2000 | Bowman-Amuah | |
| 6,601,055 B1 | 7/2003 | Roberts | |
| 7,013,263 B1 | 3/2006 | Isaka et al. | |
| 7,222,078 B2 | 5/2007 | Abelow | |
| 7,385,716 B1 | 6/2008 | Skaanning | |
| 7,594,176 B1 | 9/2009 | English | |
| 7,685,144 B1 | 3/2010 | Katragadda | |
| 7,974,860 B1 | 7/2011 | Travis | |

(Continued)

FOREIGN PATENT DOCUMENTS

| | | |
|---|---|---|
| CN | 101520802 | 4/2009 |
| EP | 2159715 | 3/2010 |
| JP | 2014112316 | 6/2014 |
| WO | WO 2011/053830 | 5/2011 |

OTHER PUBLICATIONS

Bartolome et al., "Processing Unstructured Voice of Customer Feedback for Improving Content Rankings in Customer Support Systems," U.S. Appl. No. 15/094,653, filed Apr. 8, 2016.

(Continued)

*Primary Examiner* — Hamza N Algibhah
*Assistant Examiner* — Tony Williams
(74) *Attorney, Agent, or Firm* — Hawley Troxell Ennis & Hawley LLP; Philip McKay

(57) ABSTRACT

Users of a software system are provided the opportunity to participate as members of a peer-to-peer support community for the software system. Profile data is obtained indicating areas of expertise associated with members and each member can designate their status as active or non-active. Context criteria data indicating a context status for each active status member is generated. The profile data and the context criteria data for each active status member of the peer-to-peer support community is used to identify one or more sub-sets of active status members of the peer-to-peer support community who share a common context to dynamically match one or more active status members within the peer-to-peer support community and allow the matched members to provide support to each other through the software system.

30 Claims, 3 Drawing Sheets

(56) References Cited

U.S. PATENT DOCUMENTS

| | | |
|---|---|---|
| 8,200,527 B1 | 6/2012 | Thompson et al. |
| 8,311,792 B1 | 11/2012 | Podgorny et al. |
| 8,341,167 B1 | 12/2012 | Podgorny et al. |
| 8,484,228 B2 | 7/2013 | Bhattacharyya et al. |
| 8,645,298 B2 | 2/2014 | Hennig et al. |
| 8,660,849 B2 | 2/2014 | Gruber et al. |
| 8,817,968 B1 | 8/2014 | Boutcher et al. |
| 8,892,539 B2 | 11/2014 | Anand et al. |
| 8,909,568 B1 | 12/2014 | Mann et al. |
| 8,943,145 B1 | 1/2015 | Peters et al. |
| 8,983,977 B2 | 3/2015 | Ishikawa et al. |
| 9,015,031 B2 | 4/2015 | Ferrucci et al. |
| 9,060,062 B1 | 6/2015 | Madahar et al. |
| 9,063,983 B1 | 6/2015 | Lee |
| 9,247,066 B1 | 1/2016 | Stec et al. |
| 9,336,211 B1 | 5/2016 | Bousquet et al. |
| 9,336,269 B1 | 5/2016 | Smith et al. |
| 9,342,608 B2 | 5/2016 | Cook et al. |
| 9,460,191 B1 | 10/2016 | Gaucher et al. |
| 9,471,883 B2 | 10/2016 | Chatterjee et al. |
| 9,582,757 B1 | 2/2017 | Holmes et al. |
| 9,633,309 B2 | 4/2017 | Giffels et al. |
| 9,779,388 B1 | 10/2017 | Hansen et al. |
| 9,887,887 B2 | 2/2018 | Hunter et al. |
| 9,892,367 B2 | 2/2018 | Guo et al. |
| 9,910,886 B2 | 3/2018 | Adams, Jr. et al. |
| 10,002,177 B1 | 6/2018 | McClintock et al. |
| 10,083,213 B1 | 9/2018 | Podgorny et al. |
| 10,134,050 B1 | 11/2018 | Hung et al. |
| 10,147,037 B1 | 12/2018 | Podgorny et al. |
| 10,162,734 B1 | 12/2018 | Podgorny et al. |
| 2002/0111888 A1 | 8/2002 | Stanley et al. |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0099924 A1 | 5/2003 | Tsuboi et al. |
| 2003/0144873 A1 | 7/2003 | Keshel |
| 2004/0024739 A1 | 2/2004 | Copperman et al. |
| 2005/0114327 A1 | 5/2005 | Kumamoto et al. |
| 2006/0085750 A1 | 4/2006 | Easton et al. |
| 2006/0265232 A1 | 11/2006 | Katariya et al. |
| 2007/0011131 A1 | 1/2007 | Delefevre |
| 2007/0219863 A1 | 9/2007 | Park et al. |
| 2007/0259325 A1 | 11/2007 | Clapper |
| 2008/0189197 A1 | 8/2008 | Allanson et al. |
| 2008/0208610 A1 | 8/2008 | Thomas et al. |
| 2008/0215541 A1 | 9/2008 | Li et al. |
| 2008/0294637 A1 | 11/2008 | Liu |
| 2009/0012926 A1 | 1/2009 | Ishikawa et al. |
| 2009/0119575 A1 | 5/2009 | Velusamy |
| 2009/0162824 A1 | 6/2009 | Heck |
| 2009/0248659 A1 | 10/2009 | McCool et al. |
| 2009/0253112 A1 | 10/2009 | Cao et al. |
| 2009/0265340 A1 | 10/2009 | Barcklay et al. |
| 2010/0068687 A1 | 3/2010 | Bertelsen |
| 2010/0070554 A1 | 3/2010 | Richardson et al. |
| 2010/0076998 A1* | 3/2010 | Podgorny ............ G06Q 10/10 707/772 |
| 2010/0088262 A1 | 4/2010 | Visel et al. |
| 2010/0185630 A1* | 7/2010 | Cheng ............ G06F 17/30867 707/756 |
| 2010/0191686 A1 | 7/2010 | Wang et al. |
| 2010/0203492 A1 | 8/2010 | Nibe et al. |
| 2010/0205550 A1 | 8/2010 | Chen et al. |
| 2010/0235361 A1 | 9/2010 | Chandran et al. |
| 2010/0241971 A1* | 9/2010 | Zuber ............ G06F 17/30011 715/753 |
| 2010/0318919 A1 | 12/2010 | Murphy et al. |
| 2011/0055699 A1 | 3/2011 | Li et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0264569 A1 | 10/2011 | Houseworth et al. |
| 2011/0282892 A1 | 11/2011 | Castellani et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0084120 A1 | 4/2012 | Hirsch et al. |
| 2012/0084185 A1 | 4/2012 | Ciaramitaro et al. |
| 2012/0084293 A1 | 4/2012 | Brown et al. |
| 2012/0095976 A1 | 4/2012 | Hebenthal et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0166438 A1 | 6/2012 | Wu et al. |
| 2012/0219142 A1 | 8/2012 | Gould |
| 2012/0233191 A1 | 9/2012 | Ramanujam |
| 2012/0331052 A1* | 12/2012 | Rathod ............ G06F 17/30867 709/204 |
| 2013/0019286 A1 | 1/2013 | Barborak et al. |
| 2013/0054497 A1 | 2/2013 | Garland et al. |
| 2013/0066693 A1 | 3/2013 | Laird-McConnell et al. |
| 2013/0073390 A1 | 3/2013 | Konig et al. |
| 2013/0110823 A1 | 5/2013 | Su et al. |
| 2013/0111323 A1 | 5/2013 | Taghaddos et al. |
| 2013/0117677 A1 | 5/2013 | St Jacques, Jr. |
| 2013/0282363 A1 | 10/2013 | Fan et al. |
| 2013/0285855 A1 | 10/2013 | Dupray et al. |
| 2013/0297553 A1 | 11/2013 | Bierner |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1 | 1/2014 | Gechter et al. |
| 2014/0052606 A1 | 2/2014 | Vasudevan et al. |
| 2014/0075004 A1 | 3/2014 | Van Dusen et al. |
| 2014/0088944 A1 | 3/2014 | Natarajan et al. |
| 2014/0114822 A1* | 4/2014 | Sharma ................ G06Q 40/12 705/31 |
| 2014/0119531 A1 | 5/2014 | Tuchman et al. |
| 2014/0172883 A1 | 6/2014 | Clark et al. |
| 2014/0189829 A1 | 7/2014 | McLachlan et al. |
| 2014/0195613 A1* | 7/2014 | Ogilvie ............ H04L 63/0421 709/204 |
| 2014/0201045 A1 | 7/2014 | Pai et al. |
| 2014/0222669 A1 | 8/2014 | Novak et al. |
| 2014/0280070 A1 | 9/2014 | George et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0052087 A1 | 2/2015 | Srinivasan et al. |
| 2015/0058380 A1* | 2/2015 | Polonsky ............ H04L 67/306 707/812 |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0229531 A1 | 8/2015 | O'Sullivan et al. |
| 2015/0254785 A1 | 9/2015 | Yang et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0103833 A1 | 4/2016 | Sanders et al. |
| 2016/0148222 A1 | 5/2016 | Davar et al. |
| 2016/0148321 A1 | 5/2016 | Ciaramitaro et al. |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0217472 A1 | 7/2016 | Podgorny et al. |
| 2016/0283491 A1 | 9/2016 | Lu et al. |
| 2016/0306846 A1 | 10/2016 | Adams, Jr. et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0124184 A1 | 5/2017 | Podgorny et al. |
| 2017/0270159 A1 | 9/2017 | Wang et al. |
| 2017/0323233 A1 | 11/2017 | Bencke et al. |
| 2018/0032890 A1 | 2/2018 | Podgorny et al. |

(56) References Cited

U.S. PATENT DOCUMENTS

| | | |
|---|---|---|
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2019/0018692 A1 | 1/2019 | Indyk et al. |
| 2019/0018899 A1 | 1/2019 | Podgorny et al. |

OTHER PUBLICATIONS

Podgorny, et al., "Content Quality and User Ranking in TurboTax AnswerXchange," Proceedings of the European Conference on Social Media, University of Brighton UK, Jul. 10-11, 2014.

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the $33^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Dror, et al., "From Query to Question in One Click: Suggesting Synthetic Questions to Searchers," International World Wide Web Conferences Steering Committee, May 13, 2013, pp. 391-401.

\* cited by examiner

METHOD AND SYSTEM FOR PROVIDING A DYNAMICALLY UPDATED EXPERTISE AND CONTEXT BASED PEER-TO-PEER CUSTOMER SUPPORT SYSTEM WITHIN A SOFTWARE APPLICATION

BACKGROUND

Software systems including, but not limited to, individual software applications, have become indispensable tools for helping consumers, i.e., users of the software systems, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability of the software system provider to implement and provide a user/customer support system through which a given user can obtain assistance and, in particular, get answers to questions that arise during the installation and operation of the software system. However, providing potentially millions of software system users specialized advice and answers to their specific questions is a huge undertaking that can easily, and rapidly, become economically infeasible for the software system provider.

To address this problem, many providers of software systems implement or sponsor customer support systems, such as question and answer based customer support systems. Typically, a question and answer based customer support system includes a hosted forum through which an asking user can direct their specific questions, typically in a text format, to a support community that often includes other users and/or professional agent support personnel.

Currently available customer support systems are typically provided as a feature that is accessed through a portal or interface that is, at best, accessible in association with an application the asking user is currently using, but which is typically separate from the current application display and requires the asking user to leave the context, and often the application itself, in which the question or issue arose. In addition, using currently available customer support systems, when an asking user submits a question, e.g., submits question data, the question data is then posted in a customer support question and answer database. Once the question data is posted, the customer support question and answer database must then be accessed by any of the members of the support community, once again typically via a separate portal or interface. The members of the support community must then read through the questions submitted to determine if they have the expertise, and time, to answer a given submitted question. Typically, members of the support community currently have no mechanism for indicating their availability to answer any questions, much less specific types of questions or topics. In addition, there is typically no personal connection between the asking user and the members of the support community in that the asking user typically does not select a specific member of the support community but instead submits the question to the entire support community.

Consequently, using currently available customer support systems, an asking user must leave the context of their current location in the application, which is often where the question arose, and submit their question data to a separate customer support question and answer database. Then the asking user must wait for a non-specified member of the support community, hopefully with the proper expertise, to also leave the context of their current location in the application and separately access the customer support question and answer database, read through recent questions submitted by all asking users, and then hopefully find the asking users question at a time when the member of the support community is prepared to submit a response. The member of the support community with the proper expertise must then respond to the question and post the answer to the customer support question and answer database. Then the asking user must again access the separate customer support question and answer database to obtain the answer to the asking user's question.

Clearly, the situation described above is inefficient and inconvenient for both the asking user and the members of the support community. This, in and of itself, diminishes the usefulness of currently available customer support systems. However, given that many members of the support community are volunteers, the shortcomings of currently available customer support systems are potentially far more significant than mere inefficiency or inconvenience. This is because many potential support community members may simply decline to participate in currently available customer support systems due to the inconvenience and inefficiency involved.

The situation described above presents several challenges to the providers of customer support systems. These challenges are partially significant given that there is, by definition, a finite number of support resources, such as, for example, support personnel, either volunteers or professionals, and, therefore, there is a limit to the amount of support resources, such as support person-hours, available at any time to answer user questions. Consequently, it is important to utilize support resources, such as a support community, efficiently.

Despite this long standing need, traditional customer support systems typically do not address the issue discussed above. Consequently, the situation described above represents a long standing problem for customer support systems and software system providers. This is because user satisfaction with the customer support systems is critical to the satisfaction and reputation of the software system and the software system provider. As a result of the situation described above, currently, both users and providers of software systems, and customer support systems of all types, are denied the full potential of the customer support systems. Consequently, the technical fields of information dissemination, customer support, feedback utilization and integration, software implementation and operation, and user experience are detrimentally affected.

What is needed is a method and system for dynamically providing asking users of a software system access to members of a support community for the software system that have the expertise required and that are currently working in the same context as the asking user, such as those working same location within the software system as the asking user's current location within the software system. In this way, the asking users can connect with other users of the software system who have the required expertise to answer the asking user's question, and who are currently working within the same area or context of the software system as the asking user. As a result, an expertise and context based peer-to-peer assistance and customer support system could be provided that would be more effective, efficient, and convenient than currently available customer support systems.

SUMMARY

Embodiments of the present disclosure address some of the shortcomings associated with traditional customer support systems by providing a software system to one or more users. In accordance with one embodiment, one or more of the users of the software system are then provided the opportunity to participate as members of a peer-to-peer support community for the software system.

In accordance with one embodiment, profile data for each member of the peer-to-peer support community is obtained indicating areas of expertise associated with each member of the peer-to-peer support community. In one embodiment, each member of the peer-to-peer support community is then provided the capability to enter, and/or change, status data associated with the member of the peer-to-peer support community. In one embodiment, the status data indicates an active current status or inactive current status for the member of the peer-to-peer support community, with active status data indicating the member of the peer-to-peer support community is currently available to provide support to other members of the peer-to-peer support community and the inactive status indicating the member of the peer-to-peer support community is currently not available to provide support to other members of the peer-to-peer support community.

In one embodiment, one or more context criteria are defined that indicate a context status and context criteria data is then generated representing the context criteria state for each active status member of the peer-to-peer support community. In one embodiment, the context criteria data is used to define sub-sets of active members of the peer-to-peer support community having at least one common context criterion.

In one embodiment, the analysis of the profile data and the context criteria data for each active status member of the peer-to-peer support community is conducted on a periodic, and/or continuous, basis so that as the profile data and the context criteria data for each active status member of the peer-to-peer support community changes, the sub-set of one or more active status members of the peer-to-peer support community who share a common context is dynamically and automatically updated.

In one embodiment, each member of a sub-set of active members of the peer-to-peer support community having at least one common context criterion is provided a dynamically updated listing of all other members of the sub-set of active status members of the peer-to-peer support community who share a common context within the software system and each member of a sub-set of active members of the peer-to-peer support community having at least one common context criterion are provided the capability to make contact with the other members of the sub-set of active status members of the peer-to-peer support community who share a common context through the software system.

Consequently, using the embodiment discussed above, expertise profile data is collected for members of a peer-to-peer support community indicating the areas of expertise associated with each member of the peer-to-peer support community. In this way, members of the peer-to-peer support community can be classified into sub-sets of members with specific types of expertise.

In addition, the members of the peer-to-peer support community are provided the opportunity to determine when they are willing and available to provide support. Consequently, members of a peer-to-peer support community can define their areas of expertise and when they are available to help other users of the software system. This provides the members of the peer-to-peer support community more control over their participation in the peer-to-peer support community.

In addition, in accordance with one embodiment, context criteria data, such as data indicating where in the software system each member of the peer-to-peer support community is currently working, is used, along with the expertise data from the peer-to-peer support community member profiles, to group active members of the peer-to-peer support community who meet a given context criteria data, e.g., that are currently working in the same application, module, interface screen, or data entry field, into sub-sets of active members of the peer-to-peer support community. Consequently, a resulting sub-set of members of the peer-to-peer support community who have the desired expertise, have indicated an active status, i.e., a willingness to provide support, and that are working in a common context are created and connected within that same context. As a result, the work flow and focus of the sub-set of members of the peer-to-peer support community is not disrupted.

In addition, in one embodiment, the analysis of the profile data and the context criteria data for each active status member of the peer-to-peer support community is conducted on a periodic, and/or continuous, basis so that as the profile data and the context criteria data for each active status member of the peer-to-peer support community changes, the sub-sets of one or more active status members of the peer-to-peer support community are dynamically and automatically updated.

In accordance with one embodiment, a listing of the sub-set of members of the peer-to-peer support community is provided to all sub-set members within the software system and, in one embodiment, within the interface or page currently being viewed by the sub-set members. Consequently, the sub-set members do not need to leave the application, interface, and/or context, in which the question, or need for support, arose.

In one embodiment, each member of a given sub-set of members of the peer-to-peer support community is provided the capability to make contact with one or more of the matched other members of the peer-to-peer support community through the software system and, in one embodiment, within the interface or page currently being viewed by the sub-set members. Consequently, any member of a sub-set of members of the peer-to-peer support community can establish communication with any other member of the sub-set of members of the peer-to-peer support community through the software system and, in one embodiment, within the interface or page currently being viewed. Consequently, the sub-set members do not need to leave the application, interface, and/or context, in which they are currently working to take advantage of, and/or participate in, the customer support system.

In one embodiment, a software system is provided to one or more users. In accordance with one embodiment, one or more of the users of the software system are then provided the opportunity to participate as members of a peer-to-peer support community for the software system.

In accordance with one embodiment, profile data for each member of the peer-to-peer support community is obtained indicating areas of expertise associated with each member of the peer-to-peer support community. In one embodiment, each member of the peer-to-peer support community is then provided the capability to enter, and/or change, status data associated with the member of the peer-to-peer support community. In one embodiment, the status data indicates an active current status or inactive current status for the member of the peer-to-peer support community, with active status data indicating the member of the peer-to-peer support community is currently available to provide support to other members of the peer-to-peer support community and the inactive status indicating the member of the peer-to-peer support community is currently not available to provide support to other members of the peer-to-peer support community.

In one embodiment, one or more context criteria are defined that indicate a context status and context criteria data is then generated representing the context criteria state for each active status member of the peer-to-peer support community. In one embodiment, the context criteria data is used to define sub-sets of active members of the peer-to-peer support community having at least one common context criterion. The sub-sets of active members of the peer-to-peer support community having at least one common context criterion are then used to match active status members of the peer-to-peer support community with asking members of the peer-to-peer support community.

In one embodiment, when a determination is made that a given member of the peer-to-peer support community is in need of, or potentially in need of, support from one or more other members of the of the peer-to-peer support community, the identified member of the peer-to-peer support community in need of, or potentially in need of, support from one or more other members of the of the peer-to-peer support community, is labeled an asking member of the peer-to-peer support community.

In one embodiment, the profile data and the context criteria data for each active status member of the peer-to-peer support community and the profile data and/or context criteria data for the asking member of the peer-to-peer support community is analyzed and used to match one or more active status members of the peer-to-peer support community with the asking member of the peer-to-peer support community to identify a sub-set of active status members of the peer-to-peer support community that could be of assistance to the asking member of the peer-to-peer support community.

In one embodiment, the analysis of the profile data and the context criteria data for each active status member of the peer-to-peer support community and the profile data and/or context criteria data for the asking member of the peer-to-peer support community is conducted on a periodic, and/or continuous, basis so that as the profile data and the context criteria data for each active status member of the peer-to-peer support community and the profile data and/or context criteria data for the asking member of the peer-to-peer support community changes, the sub-set of one or more active status members of the peer-to-peer support community matched with the asking member of the peer-to-peer support community is dynamically and automatically updated.

In one embodiment, the asking member of the peer-to-peer support community is then provided the capability to make contact with one or more of the matched one or more active status members of the peer-to-peer support community through the software system.

In accordance with the embodiment discussed above, expertise profile data is collected for members of a peer-to-peer support community indicating the areas of expertise associated with each member of the peer-to-peer support community. In this way, members of the peer-to-peer support community can be classified into sub-sets of members with specific types of expertise. In addition, the members of the peer-to-peer support community are provided the opportunity to determine when they are willing and available to provide support. Consequently, using the disclosed method and system for providing a dynamically updated expertise and context based peer-to-peer customer support system within a software system, members of a peer-to-peer support community can define their areas of expertise and when they are available to help other users of the software system. This provides the members of the peer-to-peer support community more control over their participation in the peer-to-peer support community. Since, as noted above, many support community members are volunteers, providing the members of the peer-to-peer support community more control over their participation can be a critical factor in retaining their services.

In addition, in accordance with one embodiment of the disclosed method and system for providing a dynamically updated expertise and context based peer-to-peer customer support system within a software system, context criteria data, such as data indicating where in the software system each member of the peer-to-peer support community is currently working, is used, along with the expertise data from the peer-to-peer support community member profiles, to match an asking member of the peer-to-peer support community with active status members of the peer-to-peer support community who meet the context criteria data, e.g., that are currently working in the same application, module, interface screen, or data entry field as the asking member of the peer-to-peer support community. Consequently, a resulting sub-set of members of the peer-to-peer support community who have the desired expertise, have indicated an active status, i.e., a willingness to provide support, are matched to asking members of the peer-to-peer support community based on a common context so that the matched asking members of the peer-to-peer support community and active status members of the peer-to-peer support community are connected within that same context. As a result, the work flow and focus of neither the asking members of the peer-to-peer support community nor the matched active status members of the peer-to-peer support community is disrupted.

In addition, in one embodiment, the analysis of the profile data and the context criteria data for each active status member of the peer-to-peer support community and the profile data and/or context criteria data for the asking member of the peer-to-peer support community is conducted on a periodic, and/or continuous, basis so that as the profile data and the context criteria data for each active status member of the peer-to-peer support community and the profile data and/or context criteria data for the asking member of the peer-to-peer support community changes, the sub-set of one or more active status members of the peer-to-peer support community matched with the asking member of the peer-to-peer support community is dynamically and automatically updated.

In accordance with one embodiment of the disclosed method and system for providing a dynamically updated expertise and context based peer-to-peer customer support system within a software system, the sub-set of one or more active status members of the peer-to-peer support community matched with the asking member of the peer-to-peer support community is provided to the asking members of the peer-to-peer support community, i.e., to all members of the peer-to-peer support community, within the software system and, in one embodiment, within the interface or page currently being viewed by the asking members of the peer-to-peer support community. Consequently, the asking members of the peer-to-peer support community do not need to leave the application, interface, and/or context, in which the question, or need for support, arose.

In one embodiment, the asking member of the peer-to-peer support community is provided the capability to make contact with one or more of the matched one or more active status members of the peer-to-peer support community through the software system and, in one embodiment, within the interface or page currently being viewed by the asking members of the peer-to-peer support community. In addition, in one embodiment, both the asking members of the peer-to-peer support community and the active members of the peer-to-peer support community can establish communication through the software system and, in one embodiment, within the interface or page currently being viewed. Consequently, neither the asking members of the peer-to-peer support community nor the answering active members of the peer-to-peer support community need to leave the application, interface, and/or context, in which they are currently working to take advantage of, and/or participate in, the customer support system.

As a result, the disclosed method and system for providing a dynamically updated expertise and context based peer-to-peer customer support system within a software system dynamically provides asking users of a software system access to a support community for the software system in the asking users current location within the software system so that the asking users can connect the other users of the software system who are members of a support community for the software system, have the required expertise to answer the asking users question, and who are currently working within the same area or context of the software system as the asking user. In this way, an expertise and context based peer-to-peer assistance and customer support system provided is more effective, efficient, and convenient than currently available customer support systems.

The disclosed method and system for providing a dynamically updated expertise and context based peer-to-peer customer support system within a software system provides for significant improvements to the technical fields of customer support, information dissemination, software implementation, and user experience. In addition, using the disclosed method and system for providing a dynamically updated expertise and context based peer-to-peer customer support system within a software system results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for providing a dynamically updated expertise and context based peer-to-peer customer support system within a software system disclosed herein.

Figure 1:
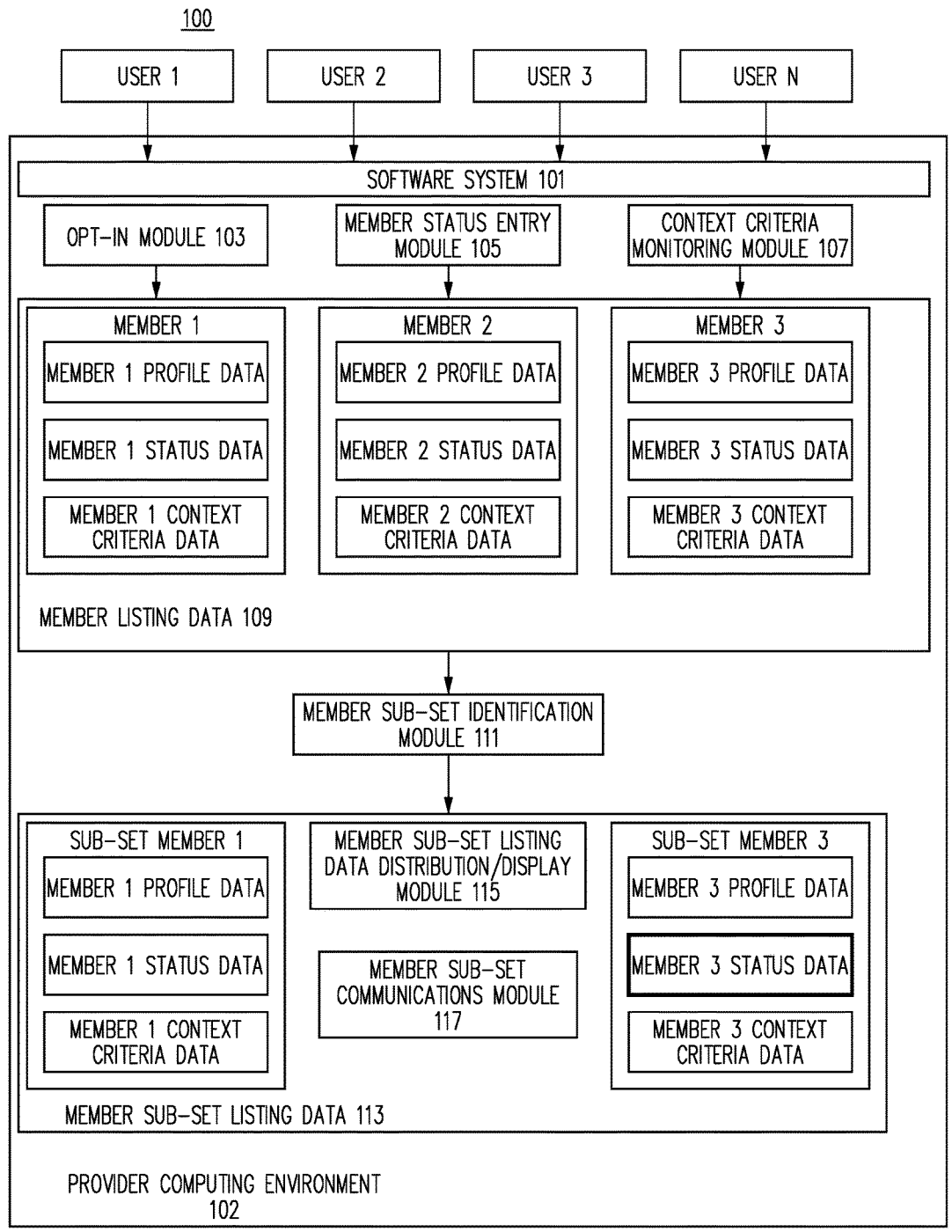
FIG. 1 is a block diagram of a hardware and production environment system for a process for providing a dynamically updated expertise and context based peer-to-peer customer support system within a software system in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

Specific examples of software systems include, but are not limited to the following: Intuit Tax Online™ available from Intuit, Inc. of Mountain View, Calif.; TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™ available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system, service, or application may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

Herein, the term "party," "user," "user consumer," and "customer" are used interchangeably to denote any party and/or entity that interfaces with, and/or to whom information is provided by, the method and system for providing a dynamically updated expertise and context based peer-to-peer customer support system within a software system described herein, and/or a person and/or entity that interfaces with, and/or to whom information is provided by, the method and system for providing a dynamically updated expertise and context based peer-to-peer customer support system within a software system described herein, and/or a legal guardian of person and/or entity that interfaces with, and/or to whom information is provided by, the method and system for providing a dynamically updated expertise and context based peer-to-peer customer support system within a software system described herein, and/or an authorized agent of any party and/or person and/or entity that interfaces with, and/or to whom information is provided by, the method and system for providing a dynamically updated expertise and context based peer-to-peer customer support system within a software system described herein. For instance, in various embodiments, a user can be, but is not limited to, a person, a commercial entity, an application, a service, and/or a computing system.

As used herein, the term "asking user" includes a user of a software system submitting a question customer support system, and/or a user of a software system potentially submitting a question to a customer support system. As used herein the term "asking member of the peer-to-peer support community" or "asking member" includes a member of the peer-to-peer support community of a software system submitting a question to the peer-to-peer support community.

As used herein, the term "support community for the software system" and/or "peer-to-peer support community for the software system" includes unpaid users, paid agents, or other support personnel who operate through software system and that are used as support resources for generating answer data associated with user submitted question data. The terms "asking user" and "asking member of the peer-to-peer support community" and "member of the peer-to-peer support community" are labels that can be applied to any user of a software system at various times and in various embodiments. Consequently, in various embodiments, and at various times, a given user of a software system can be either an "asking member of the peer-to-peer support community for the software system," and/or a "member of the peer-to-peer support community," or both.

As used herein, the term "volunteer member of the peer-to-peer support community" includes unpaid users or other support personnel who operate through a support community for the software system and that are used as support resources for generating answer data associated with user submitted question data. As a specific example, volunteer members of the peer-to-peer support community for the software system include "super users" and other volunteer support personnel certified by a provider of a software system and/or a question and answer based customer support system associated with a software system.

As used herein, the term "professional member of the peer-to-peer support community" includes paid agents or other support personnel who operate through a support community for the software system and that are used as support resources for generating answer data associated with user submitted question data. As a specific example, professional members of the peer-to-peer support community for the software system include paid customer support personnel in the employment of, or otherwise associated with, a provider of a software system and/or a question and answer based customer support system associated with a software system.

As used herein, the term member of a peer-to-peer support community does not necessarily indicate that the members of the peer-to-peer support community are professional peers, only that the members of the peer-to-peer support community are in fact members of the same peer-to-peer support community for the software system. Consequently, in various embodiments, members of a peer-to-peer support community can be current clients of other members of the peer-to-peer support community, potential clients of other members of the peer-to-peer support community, competing members of the peer-to-peer support community potentially competing for the same clients, actual professional peers or equals, or have any other professional relationship and/or status to each other, yet still be peers in the sense that they are members of the same peer-to-peer support community.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

As noted above, one major, if not determinative, factor in the utility, and ultimate commercial success, of a given software system of any type is the ability of the software system provider to implement and provide a user/customer support system through which a given user can obtain assistance and, in particular, get answers to questions that arise during the installation and operation of the software system. However, providing potentially millions of software system users specialized advice and answers to their specific questions is a huge undertaking that can easily, and rapidly, become economically infeasible for the software system provider.

As also noted above, to address this problem, many providers of software systems implement or sponsor customer support systems, such as question and answer based customer support systems. Typically, a question and answer based customer support system includes a hosted forum through which an asking user can direct their specific questions, typically in a text format, to a support community that often includes other users and/or professional agent support personnel.

Currently available customer support systems are typically provided as a feature that is accessed through a portal or interface that is, at best, accessible in association with an application the asking user is currently using, but which is typically separate from the current application display and requires the asking user to leave the context, and often the application itself, in which the question or issue arose. In addition, using currently available customer support systems, when an asking user submits a question, e.g., submits question data, the question data is then posted in a customer support question and answer database. Once the question data is posted, the customer support question and answer database must then be accessed by any of the members of the support community, once again typically via a separate portal or interface. The members of the support community must then read through the questions submitted to determine if they have the expertise, and time, to answer a given submitted question. Typically, members of the support community currently have no mechanism for indicating their availability to answer any questions, much less specific types of questions or topics. In addition, there is typically no personal connection between the asking user and the members of the support community in that the asking user typically does not select a specific member of the support community but instead submits the question to the entire support community.

Consequently, using currently available customer support systems, an asking user must leave the context of their current location in the application, which is often where the question arose, and submit their question data to a separate customer support question and answer database. Then the asking user must wait for a non-specified member of the support community, hopefully with the proper expertise, to also leave the context of their current location in the application and separately access the customer support question and answer database, read through recent questions submitted by all asking users, and then hopefully find the asking users question at a time when the member of the support community is prepared to submit a response. The member of the support community with the proper expertise must then respond to the question and post the answer to the customer support question and answer database. Then the asking user must again access the separate customer support question and answer database to obtain the answer to the asking user's question.

Clearly, the situation described above is inefficient and inconvenient for both the asking user and the members of the support community. This, in and of itself, diminishes the usefulness of currently available customer support systems. However, given that many members of the support community are volunteers, the shortcomings of currently available customer support systems are potentially far more significant than mere inefficiency or inconvenience. This is because many potential support community members may simply decline to participate in currently available customer support systems due to the inconvenience and inefficiency involved.

Embodiments of the present disclosure address some of the shortcomings associated with traditional customer support systems by providing a software system to one or more users.

In accordance with one embodiment, one or more of the users of the software system are provided the opportunity to participate as members of a peer-to-peer support community for the software system. In one embodiment, to become a member of the peer-to-peer support community, the users of the software system must specifically "opt in" as potential members of the peer-to-peer support community. In various embodiments, as part of the process of opting in as members of the peer-to-peer support community, the users are asked to provide permission for the software system, and/or the process for providing a dynamically updated expertise and context based peer-to-peer customer support system within a software system, to obtain data associated with the user including, but not limited to: data from the software system indicating historical usage of the software system by the user, and/or any data indicating areas of expertise associated with the user; data from other software systems indicating historical usage of those software systems, and/or any data indicating areas of expertise associated with the user; personal data associated with the user including, but not limited to, contact information, billing information, and/or demographic information; and/or any other data determined to needed from members of the peer-to-peer customer support system.

In one embodiment, only those users who opt in as members of the peer-to-peer support community are provided access to support from the peer-to-peer support community. Consequently, in one embodiment, in order to access the peer-to-peer support community a user must be a member of the peer-to-peer support community and indicate willingness to provide support to other members of the peer-to-peer support community. In this embodiment, by virtue of the fact that in order to receive the benefit of the peer-to-peer support community a user must be a contributor to peer-to-peer support community, a sense of responsibility and participatory membership in the peer-to-peer support community is fostered at the outset.

In accordance with one embodiment, profile data for each member of the peer-to-peer support community is obtained indicating areas of expertise associated with each member of the peer-to-peer support community. As noted above, as part of the process of opting in as members of the peer-to-peer support community, the users are asked to provide permission for the software system, and/or the process for providing a dynamically updated expertise and context based peer-to-peer customer support system within a software system, to obtain data associated with the user. In one embodiment, the data obtained is used to create a user profile for each member of the peer-to-peer support community that includes expertise data indicating areas of expertise associated with each member of the peer-to-peer support community.

In one embodiment, the expertise data of the user profile is extracted through analysis of the data obtained via the permissions granted when the user of the software system ops in as a member of the peer-to-peer support community. In one embodiment, the expertise data of the user profiles includes data submitted by the members of the peer-to-peer support community indicating their self-proclaimed areas of expertise and/or certifications.

In one embodiment, each member of the peer-to-peer support community is provided the capability to enter, and/or change, status data associated with the member of the peer-to-peer support community. In one embodiment, the status data indicates an active current status or inactive current status for the member of the peer-to-peer support community.

In one embodiment, active status data indicates the member of the peer-to-peer support community is currently available to provide support to other members of the peer-to-peer support community. In one embodiment, active status data associated with a member of the peer-to-peer support community results in the presence of the member of the peer-to-peer support community being visible within the software system to other members of the peer-to-peer support community. As discussed below, in one embodiment, only active status members of the peer-to-peer support community are considered for the various sub-groups of members of the peer-to-peer support community.

In one embodiment, inactive status data indicates the member of the peer-to-peer support community is currently not available to provide support to other members of the peer-to-peer support community. In one embodiment, inactive status data associated with a member of the peer-to-peer support community results in the presence of the member of the peer-to-peer support community being invisible to other members of the peer-to-peer support community within the software system.

By allowing members of the peer-to-peer support community to designate, and/or change, their status, members of the peer-to-peer support community are provided control with respect to when they can be approached with questions. This in turn, provides members of the peer-to-peer support community with more control over the timing and level of their participation in the peer-to-peer support community. Since, as noted above, many support community members are volunteers, providing the members of the peer-to-peer support community more control over their participation can be a critical factor in retaining their services.

In one embodiment, one or more context criteria are defined that indicate a context status of members of the peer-to-peer support community. In various embodiments, the context criteria can include, but are not limited to: the context criterion that a member of the peer-to-peer support community be using a specific designated application of the software system; the context criterion that a member of the peer-to-peer support community be working in, or otherwise interacting with, a specific designated level or location within an application of the software system; the context criterion that a member of the peer-to-peer support community be working in, or otherwise interacting with, a specific designated module of an application of the software system; the context criterion that a member of the peer-to-peer support community be working in, or otherwise interacting with, a specific designated form associated with an application of the software system; the context criterion that a member of the peer-to-peer support community be working in, or otherwise interacting with, a specific designated section of an application of the software system; the context criterion that a member of the peer-to-peer support community be working in, or otherwise interacting with, a specific designated screen of an application of the software system; the context criterion that a member of the peer-to-peer support community be working in, or otherwise interacting with, a specific designated data entry field of an application of the software system; the context criterion that a member of the peer-to-peer support community be working in a specific designated physical location; the context criterion that a member of the peer-to-peer support community be associated with a specific designated physical location; and/or any other context criterion specifically designating a location within the software system where a member of the peer-to-peer support community is currently working, or is otherwise interacting, with the software system.

In one embodiment, once the context criteria are defined, context criteria data is generated and monitored for each active status member of the peer-to-peer support community indicating the status of the context criteria associated with the member of the peer-to-peer support community.

In one embodiment, the context criteria data is used to define sub-sets of active members of the peer-to-peer support community having at least one common context criterion. The sub-sets of active members of the peer-to-peer support community having at least one common context criterion are then used to match, or group, active status members of the peer-to-peer support community.

In one embodiment, analysis of the profile data and the context criteria data for each active status member of the peer-to-peer support community is conducted to determine a sub-set of one or more active status members of the peer-to-peer support community matched with each other. In one embodiment, each member of the peer-to-peer support community that is also member of a given sub-set of members of the peer-to-peer support community is provided a common context activity pane, display, menu, or access link that either shows, accesses, or links to, a listing of all other active members of the peer-to-peer support community that are also members of the given sub-set of the members of the peer-to-peer support community, as determined by analyzing the profile data and context criteria data for the members of the peer-to-peer support community. In this way, all members of the sub-set of members of the peer-to-peer support community are provided a listing of those active members of the peer-to-peer support community who are interacting with the software system within the same context and/or have expertise associated with the member's location within the software system.

In one embodiment, analysis of the profile data and the context criteria data for each active status member of the peer-to-peer support community is conducted on a periodic, and/or continuous, basis so that as the profile data and the context criteria data for each active status member of the peer-to-peer support community changes, the sub-set of one or more active status members of the peer-to-peer support community matched is dynamically and automatically updated.

As a result, in one embodiment, dynamic analysis of profile data and the context criteria data for each active status member of the peer-to-peer support community is conducted to determine sub-sets of one or more active status members of the peer-to-peer support community matched with each other and each member of a given sub-set of active status members of the peer-to-peer support community is provided the capability to see a listing of all other active members of the peer-to-peer support community that are also members of the given sub-set of the members of the peer-to-peer support community. In addition, in one embodiment, each member of a given sub-set of active status members of the peer-to-peer support community is provided the capability to see a listing of all other active members of the peer-to-peer support community that are also members of any other sub-set of the members of the peer-to-peer support community. In addition, the members of the sub-set of active status members of the peer-to-peer support community is dynamically and automatically updated based on continuing monitoring and analysis of the profile data and context criteria data for each active status member of the peer-to-peer support community.

In one embodiment, the listing of all other active members of the peer-to-peer support community that are also members of the given sub-set of the members of the peer-to-peer support community is provided to each of the members of the sub-set of the members of the peer-to-peer support community within the software application and, in one embodiment, within the context of the members' current interaction with the software system.

In one embodiment, each member of a sub-set of members of the peer-to-peer support community is then provided the capability to make contact with one or more of the other members of the sub-set of active status members of the peer-to-peer support community through the software system. In one embodiment, each member of a sub-set of members of the peer-to-peer support community is then provided the capability to make contact with one or more of the other members of the sub-set of active status members of the peer-to-peer support community through one or more of an email, text messaging, chat service, computer call, or any other communications mechanism as discussed herein, and/or as known in the art at the time of filing, and/or as developed after the time of filing, provided through the software system and, in one embodiment, through the user interface screen or other context associated with the members current interaction with the software system.

As a specific illustrative example, in one embodiment, a user of a tax preparation application offered through a tax preparation software system may opt in to be a member of a peer-to-peer support community associated with the tax preparation application and through which member users of the tax preparation application can seek customer support from other member users of the tax preparation application.

In this specific illustrative example, when the user of the tax preparation application ops in to be a member of the peer-to-peer support community associated with the tax preparation application, that user is asked to provide permission for the process for providing a dynamically updated expertise and context based peer-to-peer customer support system within a software system to obtain and analyze that users historical use data indicating the user's use of the tax preparation application and the types and numbers of tax returns the user has processed using the tax preparation application.

In this specific illustrative example, using the permissions granted when the user of the tax preparation application ops in to be a member of the peer-to-peer support community associated with the tax preparation application, the process for providing a dynamically updated expertise and context based peer-to-peer customer support system within a software system obtains and analyzes the users historical use data indicating the user's use of the tax preparation application and the types and numbers of tax returns the user has processed using the tax preparation application. As an even more specific illustrative example, if by virtue of this analysis it is determined that the member of the peer-to-peer support community has filed a significant number of federal and California tax returns for clients who are medical doctors, then expertise data in the user profile for that member of the peer-to-peer support community will be generated that indicates the member of the peer-to-peer support community has expertise in federal and California tax filings and/or expertise filing tax returns for medical doctors.

In this specific illustrative example, when the user of the tax preparation application is accepted as a member of the peer-to-peer support community for the tax preparation application, the user is provided the opportunity to indicate their status as active and willing to provide support to the peer-to-peer support community immediately or inactive and unwilling/usable to provide support to the peer-to-peer support community at the moment. In one embodiment, each time the member of the peer-to-peer support community for the tax preparation application logs in, or otherwise interacts, with the tax preparation application, the member of the peer-to-peer support community is provided the opportunity to designate, and/or change, their status.

In this specific illustrative example, a status of active means that the member of the peer-to-peer support community will be visible to other members of the peer-to-peer support community and designated a potential source of customer support. Likewise, in this specific illustrative example, a status of inactive means a member of the peer-to-peer support community will be invisible to other members of the peer-to-peer support community and not considered for inclusion in the various sub-groups of members of the peer-to-peer support community determined as described below.

In this specific illustrative example, in one embodiment, once a user of the tax preparation application is designated a member of the peer-to-peer support community for the tax preparation application, and the status of the member of the peer-to-peer support community is designated active, the interaction of that member with the tax preparation application is tracked and, depending on the specific context criteria defined, the location and/or type of interaction with the tax preparation application is recorded and used to generate context criteria data for the member of the peer-to-peer support community. In addition, as the active status member of the peer-to-peer support community proceeds through the tax preparation application and the context criteria status for the member of the peer-to-peer support community changes, the context criteria data for the member of the peer-to-peer support community is automatically updated.

As an even more specific illustrative example, as an active member of the peer-to-peer support community proceeds from data entry in the income section of the tax preparation application to the itemized deduction section of the tax preparation application, the context criteria data for the member of the peer-to-peer support community is automatically changed from data indicating interaction with the income section of the tax preparation application to data indicating interaction with the itemized deduction section of the tax preparation application.

In addition, when the active member of the peer-to-peer support community then proceeds to interact with the itemized deductions section of the tax preparation application, the member is included in a sub-set of active members of the peer-to-peer support community currently interacting with the itemized deductions section of the tax preparation application and the active member of the peer-to-peer support community is provided a common context activity pane, display, menu, or access link, listing each of the active members of the sub-set of the members of the peer-to-peer support community within the software application that are also currently interacting with the itemized deductions section of the tax preparation application.

In this specific illustrative example, each member of a sub-set of members of the peer-to-peer support community is then provided the capability to make contact with one or more of the other members of the sub-set of active status members of the peer-to-peer support community through the software system. In one embodiment, each member of a sub-set of members of the peer-to-peer support community is then provided the capability to make contact with one or more of the other members of the sub-set of active status members of the peer-to-peer support community through one or more of an email, text messaging, chat service, computer call, or any other communications mechanism as discussed herein, and/or as known in the art at the time of filing, and/or as developed after the time of filing, provided through the tax preparation software system and, in one embodiment, through the user interface screen or other context associated with the members current interaction with the tax preparation software system.

Using the embodiment discussed above, expertise profile data is collected for members of a peer-to-peer support community indicating the areas of expertise associated with each member of the peer-to-peer support community. In this way, members of the peer-to-peer support community can be classified into sub-sets of members with specific types of expertise.

In addition, the members of the peer-to-peer support community are provided the opportunity to determine when they are willing and available to provide support. Consequently, members of a peer-to-peer support community can define their areas of expertise and when they are available to help other users of the software system. This provides the members of the peer-to-peer support community more control over their participation in the peer-to-peer support community.

In addition, in accordance with one embodiment, context criteria data, such as data indicating where in the software system each member of the peer-to-peer support community is currently working, is used, along with the expertise data from the peer-to-peer support community member profiles, to group active members of the peer-to-peer support community who meet a given context criteria data, e.g., that are currently working in the same application, module, interface screen, or data entry field, into sub-sets of active members of the peer-to-peer support community. Consequently, a resulting sub-set of members of the peer-to-peer support community who have the desired expertise, have indicated an active status, i.e., a willingness to provide support, and that are working in a common context are created and connected within that same context. As a result, the work flow and focus of the sub-set of members of the peer-to-peer support community is not disrupted.

In addition, in one embodiment, the analysis of the profile data and the context criteria data for each active status member of the peer-to-peer support community is conducted on a periodic, and/or continuous, basis so that as the profile data and the context criteria data for each active status member of the peer-to-peer support community changes, the sub-sets of one or more active status members of the peer-to-peer support community are dynamically and automatically updated.

In accordance with one embodiment, a listing of the sub-set of members of the peer-to-peer support community is provided to all sub-set members within the software system and, in one embodiment, within the interface or page currently being viewed by the sub-set members. Consequently, the sub-set members do not need to leave the application, interface, and/or context, in which the question, or need for support, arose.

In one embodiment, each member of a given sub-set of members of the peer-to-peer support community is provided the capability to make contact with one or more of the matched other members of the peer-to-peer support community through the software system and, in one embodiment, within the interface or page currently being viewed by the sub-set members. Consequently, any member of a sub-set of members of the peer-to-peer support community can establish communication with any other member of the sub-set of members of the peer-to-peer support community through the software system and, in one embodiment, within the interface or page currently being viewed. Consequently, the sub-set members do not need to leave the application, interface, and/or context, in which they are currently working to take advantage of, and/or participate in, the customer support system.

In one embodiment, a determination is made that a given member of the peer-to-peer support community is in need of, or potentially in need of, support from one or more other members of the of the peer-to-peer support community. In one embodiment, the identified member of the peer-to-peer support community in need of, or potentially in need of, support from one or more other members of the of the peer-to-peer support community, is labeled an asking member of the peer-to-peer support community.

In one embodiment, asking members of the peer-to-peer support community are identified when a member of the peer-to-peer support community submits a question. In one embodiment, asking members of the peer-to-peer support community are identified based on analysis of the amount of time the member of the peer-to-peer support community spends within a given context, such as, but not limited to: a given application; a given module; a given form; a given screen; a given section; and/or a given data entry field within the software system. In these embodiments, if the time the member of the peer-to-peer support community spends within the given context exceeds a threshold value, an assumption is made that the member of the peer-to-peer support community is in need of support.

In one embodiment, the profile data and the context criteria data for each active status member of the peer-to-peer support community and the profile data and/or context criteria data for the asking member of the peer-to-peer support community is analyzed and used to match one or more active status members of the peer-to-peer support community with the asking member of the peer-to-peer support community and thereby identify a sub-set of active status members of the peer-to-peer support community that could be of assistance to the asking member of the peer-to-peer support community.

As noted above, in one embodiment, the analysis of the profile data and the context criteria data for each active status member of the peer-to-peer support community and the profile data and/or context criteria data for the asking member of the peer-to-peer support community is conducted on a periodic, and/or continuous, basis so that as the profile data and the context criteria data for each active status member of the peer-to-peer support community and the profile data and/or context criteria data for the asking member of the peer-to-peer support community changes, the sub-set of one or more active status members of the peer-to-peer support community matched with the asking member of the peer-to-peer support community is dynamically and automatically updated.

In one embodiment, the asking member of the peer-to-peer support community is provided a common context activity pane, display, menu, or access link that either shows, accesses, or links to, a listing of all other active members of the peer-to-peer support community that are also members of the matched sub-set of the members of the peer-to-peer support community, as determined by analyzing the profile data and context criteria data for the members of the peer-to-peer support community. In this way, an asking member of the peer-to-peer support community is provided a listing of those active members of the peer-to-peer support community who are interacting with the software system within the same context and/or have expertise associated with the member's location within the software system.

In one embodiment, analysis of the profile data and the context criteria data for each active status member of the peer-to-peer support community is conducted on a periodic, and/or continuous, basis so that as the profile data and the context criteria data for each active status member of the peer-to-peer support community changes, the sub-set of one or more active status members of the peer-to-peer support community matched to the asking member of the peer-to-peer support community is dynamically and automatically updated.

In one embodiment, the listing of all other active members of the peer-to-peer support community that are also members of the matched sub-set of the members of the peer-to-peer support community is provided to the asking member of the peer-to-peer support community within the software application and, in one embodiment, within the context of the members' current interaction with the software system.

In one embodiment, the asking member of the peer-to-peer support community is provided the capability to contact each member in the listing of all other active members of the peer-to-peer support community that are also members of the matched sub-set of the members of the peer-to-peer support community through the software system. In one embodiment, the asking member of the peer-to-peer support community is provided the capability to contact each member in the listing of all other active members of the peer-to-peer support community that are also members of the matched sub-set of the members of the peer-to-peer support community through one or more of an email, text messaging, chat service, computer call, or any other communications mechanism as discussed herein, and/or as known in the art at the time of filing, and/or as developed after the time of filing, provided through the software system and, in one embodiment, through the user interface screen or other context associated with the members current interaction with the software system.

In accordance with this embodiment of the disclosed method and system for providing a dynamically updated expertise and context based peer-to-peer customer support system within a software system, expertise profile data is collected for members of a peer-to-peer support community indicating the areas of expertise associated with each member of the peer-to-peer support community. In this way, members of the peer-to-peer support community can be classified into sub-sets of members with specific types of expertise. In addition, the members of the peer-to-peer support community are provided the opportunity to determine when they are willing and available to provide support. Consequently, using the disclosed method and system for providing a dynamically updated expertise and context based peer-to-peer customer support system within a software system, members of a peer-to-peer support community can define their areas of expertise and when they are available to help other users of the software system. This provides the members of the peer-to-peer support community more control over their participation in the peer-to-peer support community. Since, as noted above, many support community members are volunteers, providing the members of the peer-to-peer support community more control over their participation can be a critical factor in retaining their services.

In addition, context criteria data, such as data indicating where in the software system each member of the peer-to-peer support community is currently working, is used, along with the expertise data from the peer-to-peer support community member profiles, to match an asking member of the peer-to-peer support community with active status members of the peer-to-peer support community who meet the context criteria data, e.g., that are currently working in the same application, module, interface screen, or data entry field as the asking member of the peer-to-peer support community. Consequently, a resulting sub-set of members of the peer-to-peer support community who have the desired expertise, have indicated an active status, i.e., a willingness to provide support, are matched to asking members of the peer-to-peer support community based on a common context so that the matched asking members of the peer-to-peer support community and active status members of the peer-to-peer support community are connected within that same context. As a result, the work flow and focus of neither the asking members of the peer-to-peer support community nor the matched active status members of the peer-to-peer support community is disrupted.

In addition, in one embodiment, the analysis of the profile data and the context criteria data for each active status member of the peer-to-peer support community and the profile data and/or context criteria data for the asking member of the peer-to-peer support community is conducted on a periodic, and/or continuous, basis so that as the profile data and the context criteria data for each active status member of the peer-to-peer support community and the profile data and/or context criteria data for the asking member of the peer-to-peer support community changes, the sub-set of one or more active status members of the peer-to-peer support community matched with the asking member of the peer-to-peer support community is dynamically and automatically updated.

In accordance with one embodiment, the sub-set of one or more active status members of the peer-to-peer support community matched with the asking member of the peer-to-peer support community is provided to the asking members of the peer-to-peer support community, i.e., to all members of the peer-to-peer support community, within the software system and, in one embodiment, within the interface or page currently being viewed by the asking members of the peer-to-peer support community. Consequently, the asking members of the peer-to-peer support community do not need to leave the application, interface, and/or context, in which the question, or need for support, arose.

In one embodiment, the asking member of the peer-to-peer support community is provided the capability to make contact with one or more of the matched one or more active status members of the peer-to-peer support community through the software system and, in one embodiment, within the interface or page currently being viewed by the asking members of the peer-to-peer support community. In addition, in one embodiment, both the asking members of the peer-to-peer support community and the active members of the peer-to-peer support community can establish communication through the software system and, in one embodiment, within the interface or page currently being viewed. Consequently, neither the asking members of the peer-to-peer support community nor the answering active members of the peer-to-peer support community need to leave the application, interface, and/or context, in which they are currently working to take advantage of, and/or participate in, the customer support system.

As a result, the disclosed embodiments of a method and system for providing a dynamically updated expertise and context based peer-to-peer customer support system within a software system dynamically provides asking users of a software system access to a support community for the software system in the asking users current location within the software system so that the asking users can connect the other users of the software system who are members of a support community for the software system, have the required expertise to answer the asking users question, and who are currently working within the same area or context of the software system as the asking user. In this way, an expertise and context based peer-to-peer assistance and customer support system provided is more effective, efficient, and convenient than currently available customer support systems.

FIG. 1 is a block diagram of a hardware and production environment system 100 for providing a process for providing a dynamically updated expertise and context based peer-to-peer customer support system within a software system in accordance with one embodiment.

As seen in FIG. 1, in one embodiment, users of software system 101, shown in FIG. 1 as user 1 through user N, access software system 101 in provider computing environment 102.

As also seen in FIG. 1, provider computing environment includes opt-in module 103 for providing one or more of user 1 through user N of software system 101 the opportunity to participate as members of a peer-to-peer support community for software system 101. This process is discussed in more detail below. In one embodiment, as a result of opting-in via opt-in module 103 a sub-set of user 1 through user N are designated member 1, member 2, and member 3 of the peer-to-peer support community for software system 101.

As also seen in FIG. 1, provider computing environment includes member listing data 109 that, in this specific illustrative example, includes profile data, status data, and context criteria data for member 1, member 2, and member 3. In this specific illustrative example, member 1 profile data includes data indicating areas of expertise associated with member 1, member 2 profile data includes data indicating areas of expertise associated with member 2, and member 3 profile data includes data indicating areas of expertise associated with member 3. In this specific illustrative example: member 1 status data includes data indicating an active or inactive status of member 1, as entered, and/or updated, by member 1 through member status entry module 105; member 2 status data includes data indicating an active or inactive status of member 2, as entered, and/or updated, by member 2 through member status entry module 105; and member 3 status data includes data indicating an active or inactive status of member 3, as entered, and/or updated, by member 3 through member status entry module 105. In this specific illustrative example: member 1 context criteria data includes data indicating the current context criteria state for member 1, as monitored and dynamically updated by context criteria monitoring module 107; member 2 context criteria data includes data indicating the current context criteria state for member 2, as monitored and dynamically updated by context criteria monitoring module 107; and member 3 context criteria data includes data indicating the current context criteria state for member 3, as monitored and dynamically updated by context criteria monitoring module 107. The acquisition, processing, and utilization of profile data, status data and context criteria data for members of the peer-to-peer support community, such as member 1, member 2, and member 3, is discussed in more detail below.

As also seen in FIG. 1, provider computing environment includes member sub-set identification module 111 for using the profile data and the context criteria data for each active status member of the peer-to-peer support community to identify one or more sub-sets of active status members of the peer-to-peer support community who share a common context, as discussed in more detail below.

As a result of the analysis by member sub-set identification module 111, member sub-set listing data 113 is generated. As seen in FIG. 1, member sub-set listing data 113 includes a sub-set, sub-set member 1 and sub-set member 3, i.e., member 1 and member 3, of member 1, member 2, and member 3 of member listing data 109 that are determined to have common context criteria data, i.e., sub-set member 1 context criteria data and subset member 3 context criteria data are determined to match.

In this specific illustrative example, member 1 profile data for sub-set member 1 includes data indicating areas of expertise associated with member 1 as entered and/or updated and member 3 profile data for sub-set member 3 includes data indicating areas of expertise associated with member 3 as entered and/or updated. In this specific illustrative example, sub-set member 1 status data for sub-set member 1 includes data indicating an active or inactive status of member 1, as entered, and/or updated, by member 1 through member status entry module 105 and sub-set member 3 status data for sub-set member 3 includes data indicating an active or inactive status of member 3, as entered, and/or updated, by member 3 through member status entry module 105. In this specific illustrative example, sub-set member 1 context criteria data for sub-set member 1 includes data indicating the current context criteria state for member 1, as it is continued to be monitored and dynamically updated by context criteria monitoring module 107 and sub-set member 3 context criteria data for sub-set member 3 includes data indicating the current context criteria state for member 3, as it is continued to be monitored and dynamically updated by context criteria monitoring module 107.

As also seen in FIG. 1, provider computing environment includes member sub-set listing data distribution/display module 115 providing each member of each sub-set of active status members of the peer-to-peer support community who share a common context, i.e., member 1 and member 3 in this example, a listing of all other members of the sub-set of active status members of the peer-to-peer support community who share a common context. As also seen in FIG. 1, provider computing environment includes member sub-set communications module 117 providing each member of the sub-set of active status members of the peer-to-peer support community who share a common context, i.e., member 1 and member 3 in this example, the capability to make contact with the other members of the sub-set of active status members of the peer-to-peer support community who share a common context through the software system. The operation and interaction of the various components shown in FIG. 1, are discussed in more detail below.

The disclosed method and system for providing a dynamically updated expertise and context based peer-to-peer customer support system within a software system provides for significant improvements to the technical fields of customer support, information dissemination, software implementation, and user experience. In addition, using the disclosed method and system for providing a dynamically updated expertise and context based peer-to-peer customer support system within a software system results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for providing a dynamically updated expertise and context based peer-to-peer customer support system within a software system disclosed herein.

Process

In accordance with one embodiment of a process for providing a dynamically updated expertise and context based peer-to-peer customer support system within a software system a software system to one or more users. In accordance with one embodiment, one or more of the users of the software system are then provided the opportunity to participate as members of a peer-to-peer support community for the software system.

In accordance with one embodiment, profile data for each member of the peer-to-peer support community is obtained indicating areas of expertise associated with each member of the peer-to-peer support community. In one embodiment, each member of the peer-to-peer support community is then provided the capability to enter, and/or change, status data associated with the member of the peer-to-peer support community. In one embodiment, the status data indicates an active current status or inactive current status for the member of the peer-to-peer support community, with active status data indicating the member of the peer-to-peer support community is currently available to provide support to other members of the peer-to-peer support community and the inactive status indicating the member of the peer-to-peer support community is currently not available to provide support to other members of the peer-to-peer support community.

In one embodiment, one or more context criteria are defined that indicate a context status and context criteria data is then generated representing the context criteria state for each active status member of the peer-to-peer support community. In one embodiment, the context criteria data is used to define sub-sets of active members of the peer-to-peer support community having at least one common context criterion.

In one embodiment, the analysis of the profile data and the context criteria data for each active status member of the peer-to-peer support community is conducted on a periodic, and/or continuous, basis so that as the profile data and the context criteria data for each active status member of the peer-to-peer support community changes, the sub-set of one or more active status members of the peer-to-peer support community who share a common context is dynamically and automatically updated.

In one embodiment, each member of a sub-set of active members of the peer-to-peer support community having at least one common context criterion is provided a dynamically updated listing of all other members of the sub-set of active status members of the peer-to-peer support community who share a common context within the software system and each member of a sub-set of active members of the peer-to-peer support community having at least one common context criterion are provided the capability to make contact with the other members of the sub-set of active status members of the peer-to-peer support community who share a common context through the software system.

Figure 2:
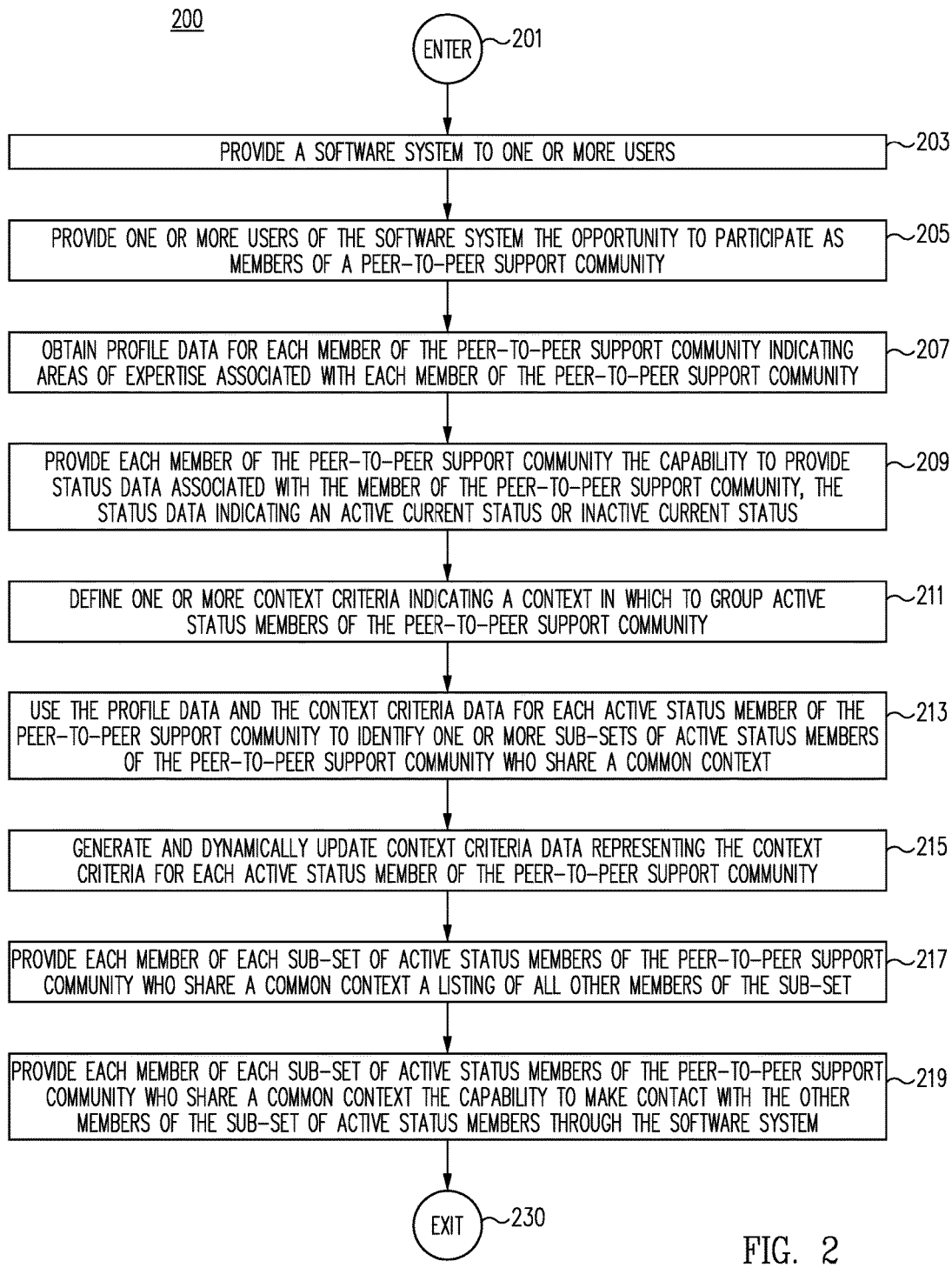
FIG. 2 is a flow chart representing one example of a generalized process for providing a dynamically updated expertise and context based peer-to-peer customer support system within a software system in accordance with one embodiment.

FIG. 2 is a flow chart representing one example of a process 200 for providing a dynamically updated expertise and context based peer-to-peer customer support system within a software system in accordance with one embodiment.

As seen in FIG. 2, process 200 for providing a dynamically updated expertise and context based peer-to-peer customer support system within a software system begins at ENTER OPERATION 201 and process flow proceeds to PROVIDE A SOFTWARE SYSTEM TO ONE OR MORE USERS OPERATION 203.

In one embodiment, at PROVIDE A SOFTWARE SYSTEM TO ONE OR MORE USERS OPERATION 203, a software system is provided for use by one or more users. In various embodiments, the software system of is any software system as discussed herein, and/or as known at the time of filling, and/or as developed after the time of filing.

In one embodiment, once a software system is provided for use by one or more users at PROVIDE A SOFTWARE SYSTEM TO ONE OR MORE USERS OPERATION 203, process flow proceeds to PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205.

In one embodiment, at PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205, one or more of the users of the software system of PROVIDE A SOFTWARE SYSTEM TO ONE OR MORE USERS OPERATION 203 are provided the opportunity to participate as members of a peer-to-peer support community for the software system.

In one embodiment, to become a member of the peer-to-peer support community of PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205, the users of the software system must specifically "opt in" as potential members of the peer-to-peer support community. In various embodiments, as part of the process of opting in as members of the peer-to-peer support community, the users are asked to provide permission for the software system, and/or process 200 for providing a dynamically updated expertise and context based peer-to-peer customer support system within a software system, to obtain data associated with the user including, but not limited to: data from the software system indicating historical usage of the software system by the user, and/or any data indicating areas of expertise associated with the user; data from other software systems indicating historical usage of those software systems and/or any data indicating areas of expertise associated with the user; personal data associated with the user including, but not limited to, contact information, billing information, and/or demographic information; and/or any other data determined to be required from members of the peer-to-peer customer support system.

In one embodiment, only those users who opt in as members of the peer-to-peer support community at PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205 are provided access to support from the peer-to-peer support community. Consequently, in one embodiment, in order to access the peer-to-peer support community a user must be a member of the peer-to-peer support community and indicate willingness to provide support to other members of the peer-to-peer support community. In this embodiment, by virtue of the fact that in order to receive the benefit of the peer-to-peer support community a user must be a contributor to peer-to-peer support community, a sense of responsibility and participatory membership in the peer-to-peer support community is fostered at the outset.

In one embodiment, once one or more of the users of the software system are provided the opportunity to participate as members of a peer-to-peer support community for the software system at PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205, process flow proceeds to OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 207.

In one embodiment, at OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 207, profile data for each member of the peer-to-peer support community of PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205 is obtained indicating areas of expertise associated with each member of the peer-to-peer support community.

As noted above, as part of the process of opting in as members of the peer-to-peer support community at PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205, the users are asked to provide permission for the software system, and/or process 200 for providing a dynamically updated expertise and context based peer-to-peer customer support system within a software system, to obtain data associated with the user including, but not limited to: data from the software system indicating historical usage of the software system by the user, and/or any data indicating areas of expertise associated with the user; data from other software systems indicating historical usage of those software systems and/or any data indicating areas of expertise associated with the user; personal data associated with the user including, but not limited to, contact information, billing information, and/or demographic information; and/or any other data determined to be required from members of the peer-to-peer customer support system.

In one embodiment, at OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 207, the data obtained at PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205 is used to create a user profile for each member of the peer-to-peer support community that includes expertise data indicating areas of expertise associated with each member of the peer-to-peer support community.

In one embodiment, the expertise data of the user profile is extracted at OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 207 through analysis of the data obtained via the permissions granted when the user of the software system ops in as a member of the peer-to-peer support community. In one embodiment, the expertise data of the user profile of OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 207 includes data submitted by the members of the peer-to-peer support community indicating their self-proclaimed areas of expertise and/or certifications.

In one embodiment, once profile data for each member of the peer-to-peer support community is generated at OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 207, process flow proceeds to PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 209.

In one embodiment, at PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 209, each member of the peer-to-peer support community of PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205 is provided the capability to enter, and/or change, status data associated with the member of the peer-to-peer support community.

In one embodiment, the status data of PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 209 indicates an active current status or inactive current status for the member of the peer-to-peer support community.

In one embodiment, active status data of PROVIDE EACH MEMBER OF THE PEER-TO-PEER SUPPORT COMMUNITY THE CAPABILITY TO PROVIDE STA- TUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 209 indicates the member of the peer-to-peer support community is currently available to provide support to other members of the peer-to-peer support community. In one embodiment, active status data associated with a member of the peer-to-peer support community results in the presence of the member of the peer-to-peer support community being visible within the software system. As discussed below, in one embodiment, only active status members of the peer-to-peer support community are considered for the various subgroups of members of the peer-to-peer support community.

In one embodiment, inactive status data of PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 209 indicates the member of the peer-to-peer support community is currently not available to provide support to other members of the peer-to-peer support community. In one embodiment, inactive status data associated with a member of the peer-to-peer support community results in the presence of the member of the peer-to-peer support community being invisible within the software system.

By allowing members of the peer-to-peer support community to designate, and/or changes their status at PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 209, members of the peer-to-peer support community are provided control with respect to when they can be approached with questions. This in turn, provides members of the peer-to-peer support community with more control over the timing and level of their participation in the peer-to-peer support community. Since, as noted above, many support community members are volunteers, providing the members of the peer-to-peer support community more control over their participation can be a critical factor in retaining their services.

In one embodiment, once each member of the peer-to-peer support community is provided the capability to enter, and/or change, status data associated with the member of the peer-to-peer support community at PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 209, process flow proceeds to DEFINE ONE OR MORE CONTEXT CRITERIA INDICATING A CONTEXT IN WHICH TO GROUP ACTIVE STATUS MEMBERS OF THE PEER-TO-PEER SUPPORT COMMUNITY OPERATION 211.

In one embodiment, at DEFINE ONE OR MORE CONTEXT CRITERIA INDICATING A CONTEXT IN WHICH TO GROUP ACTIVE STATUS MEMBERS OF THE PEER-TO-PEER SUPPORT COMMUNITY OPERATION 211, one or more context criteria are defined that indicate a context status of members of the peer-to-peer support community of PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205.

In various embodiments, the context criteria of DEFINE ONE OR MORE CONTEXT CRITERIA INDICATING A CONTEXT IN WHICH TO GROUP ACTIVE STATUS MEMBERS OF THE PEER-TO-PEER SUPPORT COMMUNITY OPERATION 211 can include, but are not limited to: the context criterion that a member of the peer-to-peer support community be using a specific designated application of the software system; the context criterion that a member of the peer-to-peer support community be working in, or otherwise interacting with, a specific designated level or location within an application of the software system; the context criterion that a member of the peer-to-peer support community be working in, or otherwise interacting with, a specific designated module of an application of the software system; the context criterion that a member of the peer-to-peer support community be working in, or otherwise interacting with, a specific designated form associated with an application of the software system; the context criterion that a member of the peer-to-peer support community be working in, or otherwise interacting with, a specific designated section of an application of the software system; the context criterion that a member of the peer-to-peer support community be working in, or otherwise interacting with, a specific designated screen of an application of the software system; the context criterion that a member of the peer-to-peer support community be working in, or otherwise interacting with, a specific designated data entry field of an application of the software system; the context criterion that a member of the peer-to-peer support community be working in a specific designated physical location; the context criterion that a member of the peer-to-peer support community be associated with a specific designated physical location; and/or any other criterion specifically designating a location within the software system where a member of the peer-to-peer support community is currently working, or is otherwise interacting, with the software system.

In one embodiment, once one or more context criteria are defined that indicate a context status of members of the peer-to-peer support community at DEFINE ONE OR MORE CONTEXT CRITERIA INDICATING A CONTEXT IN WHICH TO GROUP ACTIVE STATUS MEMBERS OF THE PEER-TO-PEER SUPPORT COMMUNITY OPERATION 211, process flow proceeds to GENERATE AND DYNAMICALLY UPDATE CONTEXT CRITERIA DATA REPRESENTING THE CONTEXT CRITERIA FOR EACH ACTIVE STATUS MEMBER OF THE PEER-TO-PEER SUPPORT COMMUNITY OPERATION 213.

In one embodiment, at GENERATE AND DYNAMICALLY UPDATE CONTEXT CRITERIA DATA REPRESENTING THE CONTEXT CRITERIA FOR EACH ACTIVE STATUS MEMBER OF THE PEER-TO-PEER SUPPORT COMMUNITY OPERATION 213, context criteria data is generated and monitored for each active status member of the peer-to-peer support community indicating the status of the context criteria associated with the member of the peer-to-peer support community.

In one embodiment, once context criteria data is generated and monitored for each active status member of the peer-to-peer support community indicating the status of the context criteria associated with the member of the peer-to-peer support community at GENERATE AND DYNAMICALLY UPDATE CONTEXT CRITERIA DATA REPRESENTING THE CONTEXT CRITERIA FOR EACH ACTIVE STATUS MEMBER OF THE PEER-TO-PEER SUPPORT COMMUNITY OPERATION 213, process flow proceeds USE THE PROFILE DATA AND THE CONTEXT CRITERIA DATA FOR EACH ACTIVE STATUS MEMBER OF THE PEER-TO-PEER SUPPORT COMMUNITY TO IDENTIFY ONE OR MORE SUB-SETS OF ACTIVE STATUS MEMBERS OF THE PEER-TO-PEER SUPPORT COMMUNITY WHO SHARE A COMMON CONTEXT OPERATION 215.

In one embodiment, at USE THE PROFILE DATA AND THE CONTEXT CRITERIA DATA FOR EACH ACTIVE STATUS MEMBER OF THE PEER-TO-PEER SUPPORT COMMUNITY TO IDENTIFY ONE OR MORE SUB-SETS OF ACTIVE STATUS MEMBERS OF THE PEER-TO-PEER SUPPORT COMMUNITY WHO SHARE A COMMON CONTEXT OPERATION 215 the profile data of OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 207 and the context criteria data of GENERATE AND DYNAMICALLY UPDATE CONTEXT CRITERIA DATA REPRESENTING THE CONTEXT CRITERIA FOR EACH ACTIVE STATUS MEMBER OF THE PEER-TO-PEER SUPPORT COMMUNITY OPERATION 213 is used to identify sub-sets of active members of the peer-to-peer support community having at least one common context criterion.

In one embodiment, once the profile data and the context criteria data are used to identify sub-sets of active members of the peer-to-peer support community having at least one common context criterion at USE THE PROFILE DATA AND THE CONTEXT CRITERIA DATA FOR EACH ACTIVE STATUS MEMBER OF THE PEER-TO-PEER SUPPORT COMMUNITY TO IDENTIFY ONE OR MORE SUB-SETS OF ACTIVE STATUS MEMBERS OF THE PEER-TO-PEER SUPPORT COMMUNITY WHO SHARE A COMMON CONTEXT OPERATION 215, process flow proceeds to PROVIDE EACH MEMBER OF EACH SUB-SET OF ACTIVE STATUS MEMBERS OF THE PEER-TO-PEER SUPPORT COMMUNITY WHO SHARE A COMMON CONTEXT A LISTING OF ALL OTHER MEMBERS OF THE SUB-SET OPERATION 217.

In one embodiment, at PROVIDE EACH MEMBER OF EACH SUB-SET OF ACTIVE STATUS MEMBERS OF THE PEER-TO-PEER SUPPORT COMMUNITY WHO SHARE A COMMON CONTEXT A LISTING OF ALL OTHER MEMBERS OF THE SUB-SET OPERATION 217 each member of the peer-to-peer support community that is also member of a given sub-set of members of the peer-to-peer support community of USE THE PROFILE DATA AND THE CONTEXT CRITERIA DATA FOR EACH ACTIVE STATUS MEMBER OF THE PEER-TO-PEER SUPPORT COMMUNITY TO IDENTIFY ONE OR MORE SUB-SETS OF ACTIVE STATUS MEMBERS OF THE PEER-TO-PEER SUPPORT COMMUNITY WHO SHARE A COMMON CONTEXT 215 is provided a dynamically updated listing of all other active members of the peer-to-peer support community that are also members of the given sub-set of the members of the peer-to-peer support community, as determined by analyzing the profile data and context criteria data for the members of the peer-to-peer support community.

As discussed above, in one embodiment, at USE THE PROFILE DATA AND THE CONTEXT CRITERIA DATA FOR EACH ACTIVE STATUS MEMBER OF THE PEER-TO-PEER SUPPORT COMMUNITY TO IDENTIFY ONE OR MORE SUB-SETS OF ACTIVE STATUS MEMBERS OF THE PEER-TO-PEER SUPPORT COMMUNITY WHO SHARE A COMMON CONTEXT 215 analysis of the context criteria data for each active status member of the peer-to-peer support community is conducted to determine a sub-set of one or more active status members of the peer-to-peer support community matched with each other.

In one embodiment, at PROVIDE EACH MEMBER OF EACH SUB-SET OF ACTIVE STATUS MEMBERS OF THE PEER-TO-PEER SUPPORT COMMUNITY WHO SHARE A COMMON CONTEXT A LISTING OF ALL OTHER MEMBERS OF THE SUB-SET OPERATION 217 each member of the peer-to-peer support community that is also member of a given sub-set of members of the peer-to-peer support community is provided a common context activity pane, display, menu, or access link that either shows, accesses, or links to, a listing of all other active members of the peer-to-peer support community that are also members of the given sub-set of the members of the peer-to-peer support community determined by analyzing the profile data and context criteria data for the members of the peer-to-peer support community.

Therefore, at PROVIDE EACH MEMBER OF EACH SUB-SET OF ACTIVE STATUS MEMBERS OF THE PEER-TO-PEER SUPPORT COMMUNITY WHO SHARE A COMMON CONTEXT A LISTING OF ALL OTHER MEMBERS OF THE SUB-SET OPERATION 217, all members of the sub-set of members of the peer-to-peer support community are provided a listing of those active members of the peer-to-peer support community who are interacting with the software system within the same context and/or have expertise associated with the member's location within the software system.

As noted above, in one embodiment, analysis of the profile data and the context criteria data for each active status member of the peer-to-peer support community is conducted on a periodic, and/or continuous, basis so that as the profile data and the context criteria data for each active status member of the peer-to-peer support community changes, the sub-set of one or more active status members of the peer-to-peer support community matched is dynamically and automatically updated.

As a result, in one embodiment, at PROVIDE EACH MEMBER OF EACH SUB-SET OF ACTIVE STATUS MEMBERS OF THE PEER-TO-PEER SUPPORT COMMUNITY WHO SHARE A COMMON CONTEXT A LISTING OF ALL OTHER MEMBERS OF THE SUB-SET OPERATION 217 dynamic analysis of profile data and the context criteria data for each active status member of the peer-to-peer support community is conducted to dynamically determine sub-sets of one or more active status members of the peer-to-peer support community matched with each other and each member of a given sub-set of active status members of the peer-to-peer support community is provided the capability to see a dynamically updated listing of all other active members of the peer-to-peer support community that are also members of the given sub-set of the members of the peer-to-peer support community. In addition, the members of the sub-set of active status members of the peer-to-peer support community are dynamically and automatically updated based on continuing analysis of the profile data and context criteria data for each active status member of the peer-to-peer support community.

In one embodiment, at PROVIDE EACH MEMBER OF EACH SUB-SET OF ACTIVE STATUS MEMBERS OF THE PEER-TO-PEER SUPPORT COMMUNITY WHO SHARE A COMMON CONTEXT A LISTING OF ALL OTHER MEMBERS OF THE SUB-SET OPERATION 217 the listing of all other active members of the peer-to-peer support community that are also members of the given sub-set of the members of the peer-to-peer support community is provided to each of the members of the sub-set of the members of the peer-to-peer support community within the software application and, in one embodiment, within the context of the members' current interaction with the software system. In addition, in one embodiment, each member of a given sub-set of active status members of the peer-to-peer support community is provided the capability to see a listing of all other active members of the peer-to-peer support community that are also members of any other sub-set of the members of the peer-to-peer support community.

In one embodiment, once each member of the peer-to-peer support community that is also member of a given sub-set of members of the peer-to-peer support community is provided a common context activity pane, display, menu, or access link that either shows, accesses, or links to, a listing of all other active members of the peer-to-peer support community that are also members of the given sub-set of the members of the peer-to-peer support community, as determined by analyzing the profile data and context criteria data for the members of the peer-to-peer support community at PROVIDE EACH MEMBER OF EACH SUB-SET OF ACTIVE STATUS MEMBERS OF THE PEER-TO-PEER SUPPORT COMMUNITY WHO SHARE A COMMON CONTEXT A LISTING OF ALL OTHER MEMBERS OF THE SUB-SET OPERATION 217, process flow proceeds to PROVIDE EACH MEMBER OF EACH SUB-SET OF ACTIVE STATUS MEMBERS OF THE PEER-TO-PEER SUPPORT COMMUNITY WHO SHARE A COMMON CONTEXT THE CAPABILITY TO MAKE CONTACT WITH THE OTHER MEMBERS OF THE SUB-SET OF ACTIVE STATUS MEMBERS THROUGH THE SOFTWARE SYSTEM OPERATION 219.

In one embodiment, at PROVIDE EACH MEMBER OF EACH SUB-SET OF ACTIVE STATUS MEMBERS OF THE PEER-TO-PEER SUPPORT COMMUNITY WHO SHARE A COMMON CONTEXT THE CAPABILITY TO MAKE CONTACT WITH THE OTHER MEMBERS OF THE SUB-SET OF ACTIVE STATUS MEMBERS THROUGH THE SOFTWARE SYSTEM OPERATION 219, each member of a sub-set of members of the peer-to-peer support community is provided the capability to make contact with one or more of the other members of the sub-set of active status members of the peer-to-peer support community through the software system. In addition, in one embodiment, each member of a given sub-set of active status members of the peer-to-peer support community is provided the capability to contact all other active members of the peer-to-peer support community that are also members of any other sub-set of the members of the peer-to-peer support community.

In one embodiment, each member of a sub-set of members of the peer-to-peer support community is then provided the capability to make contact with one or more of the other members of the sub-set of active status members of the peer-to-peer support community through one or more of an email, text messaging, chat service, computer call, or any other communications mechanism as discussed herein, and/or as known in the art at the time of filing, and/or as developed after the time of filing, provided through the software system and, in one embodiment, through the user interface screen or other context associated with the members current interaction with the software system.

In one embodiment, once each member of a sub-set of members of the peer-to-peer support community is provided the capability to make contact with one or more of the other members of the sub-set of active status members of the peer-to-peer support community through the software system at PROVIDE EACH MEMBER OF EACH SUB-SET OF ACTIVE STATUS MEMBERS OF THE PEER-TO-PEER SUPPORT COMMUNITY WHO SHARE A COMMON CONTEXT THE CAPABILITY TO MAKE CONTACT WITH THE OTHER MEMBERS OF THE SUB-SET OF ACTIVE STATUS MEMBERS THROUGH THE SOFTWARE SYSTEM OPERATION 219, process flow proceeds to EXIT OPERATION 230.

In one embodiment, at EXIT OPERATION 230, process 200 for providing a dynamically updated expertise and context based peer-to-peer customer support system within a software system is exited to await new data.

Using one embodiment of process 200 for providing a dynamically updated expertise and context based peer-to-peer customer support system within a software system, expertise profile data is collected for members of a peer-to-peer support community indicating the areas of expertise associated with each member of the peer-to-peer support community. In this way, members of the peer-to-peer support community can be classified into sub-sets of members with desired areas of expertise.

In addition, using one embodiment of process 200 for providing a dynamically updated expertise and context based peer-to-peer customer support system within a software system, the members of the peer-to-peer support community are provided the opportunity to determine when they are willing and available to provide support. Consequently, members of a peer-to-peer support community can define their areas of expertise and when they are available to help other users of the software system. This provides the members of the peer-to-peer support community more control over their participation in the peer-to-peer support community.

In addition, using one embodiment of process 200 for providing a dynamically updated expertise and context based peer-to-peer customer support system within a software system, context criteria data, such as data indicating where in the software system each member of the peer-to-peer support community is currently working, is used along with the expertise data from the peer-to-peer support community member profiles to group active members of the peer-to-peer support community who meet a given context criteria data, e.g., that are currently working in the same application, module, interface screen, or data entry field, into sub-sets of active members of the peer-to-peer support community sharing a common context. Consequently, a resulting sub-set of members of the peer-to-peer support community who have the desired expertise, have indicated an active status, i.e., a willingness to provide support, and that are working in a common context are created and connected. As a result, the work flow and focus of sub-set members is not disrupted.

In addition, using one embodiment of process 200 for providing a dynamically updated expertise and context based peer-to-peer customer support system within a software system, the analysis of the profile data and the context criteria data for each active status member of the peer-to-peer support community is conducted on a periodic, and/or continuous, basis so that as the profile data and the context criteria data for each active status member of the peer-to-peer support community changes, the sub-sets of one or more active status members of the peer-to-peer support community are dynamically and automatically updated.

Using one embodiment of process 200 for providing a dynamically updated expertise and context based peer-to-peer customer support system within a software system, a listing of the sub-set of members of the peer-to-peer support community is provided to all members of the sub-sets of members of the peer-to-peer support community within the software system and, in one embodiment, within the interface or page currently being viewed by the members of the sub-set of members of the peer-to-peer support community. Consequently, the sub-set of members do not need to leave the application, interface, and/or context, in which the question, or need for support, arose.

Using one embodiment of process 200 for providing a dynamically updated expertise and context based peer-to-peer customer support system within a software system, each member of a given sub-set of members of the peer-to-peer support community is provided the capability to make contact with one or more of the matched other members of the peer-to-peer support community through the software system and, in one embodiment, within the interface or page currently being viewed by sub-set of members of the peer-to-peer support community. Consequently, any member of a sub-set of members of the peer-to-peer support community can establish communication with any other member of the sub-set of members of the peer-to-peer support community through the software system and, in one embodiment, within the interface or page currently being viewed. Consequently, the members of a sub-set of members of the peer-to-peer support community do not need to leave the application, interface, and/or context, in which they are currently working to take advantage of, and/or participate in, the customer support system.

The disclosed method and system for providing a dynamically updated expertise and context based peer-to-peer customer support system within a software system of process 200 provides for significant improvements to the technical fields of customer support, information dissemination, software implementation, and user experience. In addition, using process 200, as disclosed herein, results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing process 200, as disclosed herein.

The various embodiments of the disclosure can be implemented to improve the technical fields of customer support, information dissemination, software implementation, and user experience. Therefore, the various described embodiments of the disclosure and their associated benefits amount to significantly more than an abstract idea.

In accordance with one embodiment of a process for providing a dynamically updated expertise and context based peer-to-peer customer support system within a software system a software system, such as a tax preparation application, is provided to one or more users. In accordance with one embodiment, one or more of the users of the software system are then provided the opportunity to participate as members of a peer-to-peer support community for the software system, in one embodiment by opting into the peer-to-peer support community for the software system.

In accordance with one embodiment, profile data for each member of the peer-to-peer support community is obtained from one or more sources, such as data in the software system indicating the member of the peer-to-peer support community's historical interaction with the software system, or data provided by the member of the peer-to-peer support community. In one embodiment, the profile data for each member of the peer-to-peer support community is analyzed to determine areas of expertise associated with each member of the peer-to-peer support community.

In one embodiment, each member of the peer-to-peer support community is then provided the capability to enter, and/or change, status data associated with the member of the peer-to-peer support community. In one embodiment, the status data indicates an active current status or inactive current status for the member of the peer-to-peer support community. In one embodiment, active status data indicates the member of the peer-to-peer support community is currently available to provide support to other members of the peer-to-peer support community and inactive status data indicates the member of the peer-to-peer support community is currently not available to provide support to other members of the peer-to-peer support community.

In one embodiment, one or more context criteria, such as criteria regarding a location within the software system currently being accessed or used by a member of the peer-to-peer support community, are defined that indicate a context status which is used to match active status members of the peer-to-peer support community with asking members of the peer-to-peer support community. In one embodiment, context criteria data is then generated representing the context criteria state for each active status member of the peer-to-peer support community.

In one embodiment, a determination is made that a given member of the peer-to-peer support community is in need of, or potentially in need of, support from one or more other members of the of the peer-to-peer support community. In one embodiment, members of the peer-to-peer support community in need of, or potentially in need of, support from one or more other members of the of the peer-to-peer support community, are identified as asking members of the peer-to-peer support community.

In one embodiment, the profile data and the context criteria data for each active status member of the peer-to-peer support community and the profile data and/or context criteria data for the asking member of the peer-to-peer support community is analyzed and used to match one or more active status members of the peer-to-peer support community with the asking member of the peer-to-peer support community. In one embodiment, the analysis of the profile data and the context criteria data for each active status member of the peer-to-peer support community and the profile data and/or context criteria data for the asking member of the peer-to-peer support community is conducted on a periodic, and/or relatively continuous, basis so that as the profile data and the context criteria data for each active status member of the peer-to-peer support community and the profile data and/or context criteria data for the asking member of the peer-to-peer support community changes, the list of one or more active status members of the peer-to-peer support community matched with the asking member of the peer-to-peer support community is dynamically and automatically updated.

In one embodiment, the asking member of the peer-to-peer support community is then provided the capability to make contact with one or more of the matched one or more active status members of the peer-to-peer support community through the software system.

Figure 3:
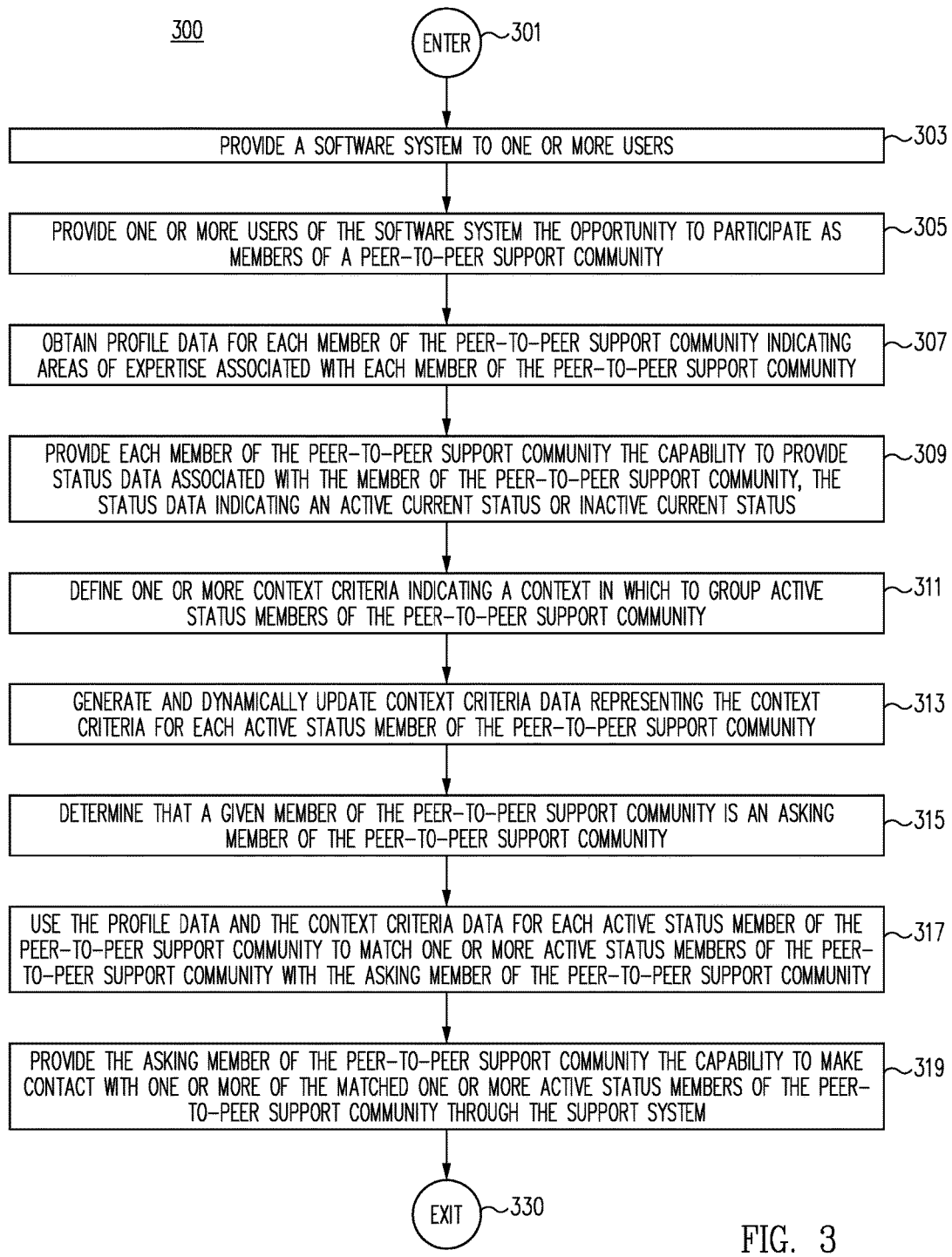
FIG. 3 is a flow chart representing one example of a generalized process for providing a dynamically updated expertise and context based peer-to-peer customer support system within a software system in accordance with one embodiment.

FIG. 3 is a flow chart representing one example of a process 300 for providing a dynamically updated expertise and context based peer-to-peer customer support system within a software system in accordance with one embodiment.

As seen in FIG. 3, process 300 for providing a dynamically updated expertise and context based peer-to-peer customer support system within a software system begins at ENTER OPERATION 301 and process flow proceeds to PROVIDE A SOFTWARE SYSTEM TO ONE OR MORE USERS OPERATION 303.

PROVIDE A SOFTWARE SYSTEM TO ONE OR MORE USERS OPERATION 303, PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 305, OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 307, PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 309, DEFINE ONE OR MORE CONTEXT CRITERIA INDICATING A CONTEXT IN WHICH TO GROUP ACTIVE STATUS MEMBERS OF THE PEER-TO-PEER SUPPORT COMMUNITY OPERATION 311, and GENERATE AND DYNAMICALLY UPDATE CONTEXT CRITERIA DATA REPRESENTING THE CONTEXT CRITERIA FOR EACH ACTIVE STATUS MEMBER OF THE PEER-TO-PEER SUPPORT COMMUNITY OPERATION 313 of process 300 for providing a dynamically updated expertise and context based peer-to-peer customer support system within a software system are substantially the same as PROVIDE A SOFTWARE SYSTEM TO ONE OR MORE USERS OPERATION 203, PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 205, OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 207, PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 209, DEFINE ONE OR MORE CONTEXT CRITERIA INDICATING A CONTEXT IN WHICH TO GROUP ACTIVE STATUS MEMBERS OF THE PEER-TO-PEER SUPPORT COMMUNITY OPERATION 211, and GENERATE AND DYNAMICALLY UPDATE CONTEXT CRITERIA DATA REPRESENTING THE CONTEXT CRITERIA FOR EACH ACTIVE STATUS MEMBER OF THE PEER-TO-PEER SUPPORT COMMUNITY OPERATION 213 of process 200 for providing a dynamically updated expertise and context based peer-to-peer customer support system within a software system as discussed above. Consequently the reader to referred to the discussion above for a description of PROVIDE A SOFTWARE SYSTEM TO ONE OR MORE USERS OPERATION 303, PROVIDE ONE OR MORE USERS OF THE SOFTWARE SYSTEM THE OPPORTUNITY TO PARTICIPATE AS MEMBERS OF A PEER-TO-PEER SUPPORT COMMUNITY OPERATION 305, OBTAIN PROFILE DATA FOR EACH MEMBER OF THE PEER-TO-PEER SUPPORT COMMUNITY INDICATING AREAS OF EXPERTISE ASSOCIATED WITH EACH MEMBER OF THE PEER-TO-PEER SUPPORT COMMUNITY OPERATION 307, PROVIDE EACH MEMBER OF THE PEER-TO-PEER SUPPORT COMMUNITY THE CAPABILITY TO PROVIDE STATUS DATA ASSOCIATED WITH THE MEMBER OF THE PEER-TO-PEER SUPPORT COMMUNITY, THE STATUS DATA INDICATING AN ACTIVE CURRENT STATUS OR INACTIVE CURRENT STATUS OPERATION 309, DEFINE ONE OR MORE CONTEXT CRITERIA INDICATING A CONTEXT IN WHICH TO GROUP ACTIVE STATUS MEMBERS OF THE PEER-TO-PEER SUPPORT COMMUNITY OPERATION 311, and GENERATE AND DYNAMICALLY UPDATE CONTEXT CRITERIA DATA REPRESENTING THE CONTEXT CRITERIA FOR EACH ACTIVE STATUS MEMBER OF THE PEER-TO-PEER SUPPORT COMMUNITY OPERATION 313.

In one embodiment, once context criteria data is generated and monitored for each active status member of the peer-to-peer support community indicating the status of the context criteria associated with the member of the peer-to-peer support community at GENERATE AND DYNAMICALLY UPDATE CONTEXT CRITERIA DATA REPRESENTING THE CONTEXT CRITERIA FOR EACH ACTIVE STATUS MEMBER OF THE PEER-TO-PEER SUPPORT COMMUNITY OPERATION 313, process flow proceeds to DETERMINE THAT A GIVEN MEMBER OF THE PEER-TO-PEER SUPPORT COMMUNITY IS AN ASKING MEMBER OF THE PEER-TO-PEER SUPPORT COMMUNITY OPERATION 315.

In one embodiment, at DETERMINE THAT A GIVEN MEMBER OF THE PEER-TO-PEER SUPPORT COMMUNITY IS AN ASKING MEMBER OF THE PEER-TO-PEER SUPPORT COMMUNITY OPERATION 315, a determination is made that a given member of the peer-to-peer support community is in need of, or potentially in need of, support from one or more other members of the of the peer-to-peer support community.

In one embodiment, at DETERMINE THAT A GIVEN MEMBER OF THE PEER-TO-PEER SUPPORT COMMUNITY IS AN ASKING MEMBER OF THE PEER-TO-PEER SUPPORT COMMUNITY OPERATION 315 the identified member of the peer-to-peer support community in need of, or potentially in need of, support from one or more other members of the of the peer-to-peer support community, is labeled an asking member of the peer-to-peer support community.

In one embodiment, asking members of the peer-to-peer support community are identified at DETERMINE THAT A GIVEN MEMBER OF THE PEER-TO-PEER SUPPORT COMMUNITY IS AN ASKING MEMBER OF THE PEER-TO-PEER SUPPORT COMMUNITY OPERATION 315 when a member of the peer-to-peer support community submits a question.

In one embodiment, asking members of the peer-to-peer support community are identified at DETERMINE THAT A GIVEN MEMBER OF THE PEER-TO-PEER SUPPORT COMMUNITY IS AN ASKING MEMBER OF THE PEER-TO-PEER SUPPORT COMMUNITY OPERATION 315 based on analysis of the amount of time the member of the peer-to-peer support community spends within a given context, such as, but not limited to: a given application; a given module; a given form; a given screen; a given section; and/or a given data entry field within the software system. In these embodiments, if the time the member of the peer-to-peer support community spends within the given context exceeds a threshold value, an assumption is made that the member of the peer-to-peer support community is in need of support.

In one embodiment, once a determination is made that a given member of the peer-to-peer support community is in need of, or potentially in need of, support from one or more other members of the of the peer-to-peer support community at DETERMINE THAT A GIVEN MEMBER OF THE PEER-TO-PEER SUPPORT COMMUNITY IS AN ASKING MEMBER OF THE PEER-TO-PEER SUPPORT COMMUNITY OPERATION 315, process flow proceeds to USE THE PROFILE DATA AND THE CONTEXT CRITERIA DATA FOR EACH ACTIVE STATUS MEMBER OF THE PEER-TO-PEER SUPPORT COMMUNITY TO MATCH ONE OR MORE ACTIVE STATUS MEMBERS OF THE PEER-TO-PEER SUPPORT COMMUNITY WITH THE ASKING MEMBER OF THE PEER-TO-PEER SUPPORT COMMUNITY OPERATION 317.

In one embodiment, at USE THE PROFILE DATA AND THE CONTEXT CRITERIA DATA FOR EACH ACTIVE STATUS MEMBER OF THE PEER-TO-PEER SUPPORT COMMUNITY TO MATCH ONE OR MORE ACTIVE STATUS MEMBERS OF THE PEER-TO-PEER SUPPORT COMMUNITY WITH THE ASKING MEMBER OF THE PEER-TO-PEER SUPPORT COMMUNITY OPERATION 317, the profile data and the context criteria data for each active status member of the peer-to-peer support community and the profile data and/or context criteria data for the asking member of the peer-to-peer support community is analyzed and used to match one or more active status members of the peer-to-peer support community with the asking member of the peer-to-peer support community and thereby identify a sub-set of active status members of the peer-to-peer support community that could be of assistance to the asking member of the peer-to-peer support community.

As noted above, in one embodiment, the analysis of the profile data and the context criteria data for each active status member of the peer-to-peer support community and the profile data and/or context criteria data for the asking member of the peer-to-peer support community is conducted on a periodic, and/or continuous, basis so that as the profile data and the context criteria data for each active status member of the peer-to-peer support community and the profile data and/or context criteria data for the asking member of the peer-to-peer support community changes, the sub-set of one or more active status members of the peer-to-peer support community matched with the asking member of the peer-to-peer support community is dynamically and automatically updated at USE THE PROFILE DATA AND THE CONTEXT CRITERIA DATA FOR EACH ACTIVE STATUS MEMBER OF THE PEER-TO-PEER SUPPORT COMMUNITY TO MATCH ONE OR MORE ACTIVE STATUS MEMBERS OF THE PEER-TO-PEER SUPPORT COMMUNITY WITH THE ASKING MEMBER OF THE PEER-TO-PEER SUPPORT COMMUNITY OPERATION 317.

In one embodiment, at USE THE PROFILE DATA AND THE CONTEXT CRITERIA DATA FOR EACH ACTIVE STATUS MEMBER OF THE PEER-TO-PEER SUPPORT COMMUNITY TO MATCH ONE OR MORE ACTIVE STATUS MEMBERS OF THE PEER-TO-PEER SUPPORT COMMUNITY WITH THE ASKING MEMBER OF THE PEER-TO-PEER SUPPORT COMMUNITY OPERATION 317 the asking member of the peer-to-peer support community is provided a common context activity pane, display, menu, or access link that either shows, accesses, or links to, a listing of all other active members of the peer-to-peer support community that are also members of the matched sub-set of the members of the peer-to-peer support community, as determined by analyzing the profile data and context criteria data for the members of the peer-to-peer support community. In this way, an asking member of the peer-to-peer support community is provided a listing of those active members of the peer-to-peer support community who are interacting with the software system within the same context and/or have expertise associated with the member's location within the software system.

In one embodiment, analysis of the profile data and the context criteria data for each active status member of the peer-to-peer support community is conducted on a periodic, and/or continuous, basis so that as the profile data and the context criteria data for each active status member of the peer-to-peer support community changes, the sub-set of one or more active status members of the peer-to-peer support community matched to the asking member of the peer-to-peer support community is dynamically and automatically updated at USE THE PROFILE DATA AND THE CONTEXT CRITERIA DATA FOR EACH ACTIVE STATUS MEMBER OF THE PEER-TO-PEER SUPPORT COMMUNITY TO MATCH ONE OR MORE ACTIVE STATUS MEMBERS OF THE PEER-TO-PEER SUPPORT COMMUNITY WITH THE ASKING MEMBER OF THE PEER-TO-PEER SUPPORT COMMUNITY OPERATION 317.

In one embodiment, at USE THE PROFILE DATA AND THE CONTEXT CRITERIA DATA FOR EACH ACTIVE STATUS MEMBER OF THE PEER-TO-PEER SUPPORT COMMUNITY TO MATCH ONE OR MORE ACTIVE STATUS MEMBERS OF THE PEER-TO-PEER SUPPORT COMMUNITY WITH THE ASKING MEMBER OF THE PEER-TO-PEER SUPPORT COMMUNITY OPERATION 317 the listing of all other active members of the peer-to-peer support community that are also members of the matched sub-set of the members of the peer-to-peer support community is provided to the asking member of the peer-to-peer support community within the software application and, in one embodiment, within the context of the members' current interaction with the software system.

In one embodiment, once the profile data and the context criteria data for each active status member of the peer-to-peer support community and the profile data and/or context criteria data for the asking member of the peer-to-peer support community is analyzed and used to match one or more active status members of the peer-to-peer support community with the asking member of the peer-to-peer support community and thereby identify a sub-set of active status members of the peer-to-peer support community that could be of assistance to the asking member of the peer-to-peer support community at USE THE PROFILE DATA AND THE CONTEXT CRITERIA DATA FOR EACH ACTIVE STATUS MEMBER OF THE PEER-TO-PEER SUPPORT COMMUNITY TO MATCH ONE OR MORE ACTIVE STATUS MEMBERS OF THE PEER-TO-PEER SUPPORT COMMUNITY WITH THE ASKING MEMBER OF THE PEER-TO-PEER SUPPORT COMMUNITY OPERATION 317, process flow proceeds to PROVIDE THE ASKING MEMBER OF THE PEER-TO-PEER SUPPORT COMMUNITY THE CAPABILITY TO MAKE CONTACT WITH ONE OR MORE OF THE MATCHED ONE OR MORE ACTIVE STATUS MEMBERS OF THE PEER-TO-PEER SUPPORT COMMUNITY THROUGH THE SOFTWARE SYSTEM OPERATION 319.

In one embodiment, at PROVIDE THE ASKING MEMBER OF THE PEER-TO-PEER SUPPORT COMMUNITY THE CAPABILITY TO MAKE CONTACT WITH ONE OR MORE OF THE MATCHED ONE OR MORE ACTIVE STATUS MEMBERS OF THE PEER-TO-PEER SUPPORT COMMUNITY THROUGH THE SOFTWARE SYSTEM OPERATION 319, the asking member of the peer-to-peer support community is provided the capability to contact each member in the listing of all other active members of the peer-to-peer support community that are also members of the matched sub-set of the members of the peer-to-peer support community through the software system.

In one embodiment, the asking member of the peer-to-peer support community is provided the capability to contact each member in the listing of all other active members of the peer-to-peer support community that are also members of the matched sub-set of the members of the peer-to-peer support community through one or more of an email, text messaging, chat service, computer call, or any other communications mechanism as discussed herein, and/or as known in the art at the time of filing, and/or as developed after the time of filing, provided through the software system and, in one embodiment, through the user interface screen or other context associated with the members current interaction with the software system.

In one embodiment, once the asking member of the peer-to-peer support community is provided the capability to contact each member in the listing of all other active members of the peer-to-peer support community that are also members of the matched sub-set of the members of the peer-to-peer support community through the software system at PROVIDE THE ASKING MEMBER OF THE PEER-TO-PEER SUPPORT COMMUNITY THE CAPABILITY TO MAKE CONTACT WITH ONE OR MORE OF THE MATCHED ONE OR MORE ACTIVE STATUS MEMBERS OF THE PEER-TO-PEER SUPPORT COMMUNITY THROUGH THE SOFTWARE SYSTEM OPERATION 319, process flow proceeds to EXIT OPERATION 330.

In one embodiment, at EXIT OPERATION 330 process 300 for providing a dynamically updated expertise and context based peer-to-peer customer support system within a software system is exited to await new data.

Using process 300 for providing a dynamically updated expertise and context based peer-to-peer customer support system within a software system, expertise profile data is collected for members of a peer-to-peer support community indicating the areas of expertise associated with each member of the peer-to-peer support community. In this way, members of the peer-to-peer support community can be classified into sub-sets of members with specific types of expertise. In addition, the members of the peer-to-peer support community are provided the opportunity to determine when they are willing and available to provide support. Consequently, using process 300 for providing a dynamically updated expertise and context based peer-to-peer customer support system within a software system, members of a peer-to-peer support community can define their areas of expertise and when they are available to help other users of the software system. This provides the members of the peer-to-peer support community more control over their participation in the peer-to-peer support community. Since, as noted above, many support community members are volunteers, providing the members of the peer-to-peer support community more control over their participation can be a critical factor in retaining their services.

In addition, using process 300 for providing a dynamically updated expertise and context based peer-to-peer customer support system within a software system, context criteria data, such as data indicating where in the software system each member of the peer-to-peer support community is currently working, is used, along with the expertise data from the peer-to-peer support community member profiles, to match an asking member of the peer-to-peer support community with active status members of the peer-to-peer support community who meet the context criteria data, e.g., that are currently working in the same application, module, interface screen, or data entry field as the asking member of the peer-to-peer support community. Consequently, a resulting sub-set of members of the peer-to-peer support community who have the desired expertise, have indicated an active status, i.e., a willingness to provide support, are matched to asking members of the peer-to-peer support community based on a common context so that the matched asking members of the peer-to-peer support community and active status members of the peer-to-peer support community are connected within that same context. As a result, the work flow and focus of neither the asking members of the peer-to-peer support community nor the matched active status members of the peer-to-peer support community is disrupted.

In addition, using process 300 for providing a dynamically updated expertise and context based peer-to-peer customer support system within a software system, the analysis of the profile data and the context criteria data for each active status member of the peer-to-peer support community and the profile data and/or context criteria data for the asking member of the peer-to-peer support community is conducted on a periodic, and/or continuous, basis so that as the profile data and the context criteria data for each active status member of the peer-to-peer support community and the profile data and/or context criteria data for the asking member of the peer-to-peer support community changes, the sub-set of one or more active status members of the peer-to-peer support community matched with the asking member of the peer-to-peer support community is dynamically and automatically updated.

Using process 300 for providing a dynamically updated expertise and context based peer-to-peer customer support system within a software system, the sub-set of one or more active status members of the peer-to-peer support community matched with the asking member of the peer-to-peer support community is provided to the asking members of the peer-to-peer support community, i.e., to all members of the peer-to-peer support community, within the software system and, in one embodiment, within the interface or page currently being viewed by the asking members of the peer-to-peer support community. Consequently, the asking members of the peer-to-peer support community do not need to leave the application, interface, and/or context, in which the question, or need for support, arose.

Using process 300 for providing a dynamically updated expertise and context based peer-to-peer customer support system within a software system, the asking member of the peer-to-peer support community is provided the capability to make contact with one or more of the matched one or more active status members of the peer-to-peer support community through the software system and, in one embodiment, within the interface or page currently being viewed by the asking members of the peer-to-peer support community. In addition, in one embodiment, both the asking members of the peer-to-peer support community and the active members of the peer-to-peer support community can establish communication through the software system and, in one embodiment, within the interface or page currently being viewed. Consequently, neither the asking members of the peer-to-peer support community nor the answering active members of the peer-to-peer support community need to leave the application, interface, and/or context, in which they are currently working to take advantage of, and/or participate in, the customer support system.

As a result, the disclosed embodiments of a method and system for providing a dynamically updated expertise and context based peer-to-peer customer support system within a software system dynamically provides asking users of a software system access to a support community for the software system in the asking users current location within the software system so that the asking users can connect the other users of the software system who are members of a support community for the software system, have the required expertise to answer the asking users question, and who are currently working within the same area or context of the software system as the asking user. In this way, an expertise and context based peer-to-peer assistance and customer support system provided is more effective, efficient, and convenient than currently available customer support systems.

The disclosed method and system for providing a dynamically updated expertise and context based peer-to-peer customer support system within a software system of process 300 provides for significant improvements to the technical fields of customer support, information dissemination, software implementation, and user experience. In addition, using process 300, as disclosed herein, results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing process 300, as disclosed herein.

The various embodiments of the disclosure can be implemented to improve the technical fields of customer support, information dissemination, software implementation, and user experience. Therefore, the various described embodiments of the disclosure and their associated benefits amount to significantly more than an abstract idea.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "generating," "determining," "defining," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A method comprising:

providing one or more users of a financial management application program the opportunity to participate as members of a peer-to-peer support community for the financial management application program, wherein functionality pertaining to the peer-to-peer support community is provided within the provided financial management application program;

obtaining profile data for each member of the peer-to-peer support community, the profile data indicating areas of expertise of each member of the peer-to-peer support community;

providing each member of the peer-to-peer support community the capability to provide status data associated with the member of the peer-to-peer support community, the status data indicating an active current status or inactive current status;

defining one or more context criteria indicating a context in which to match active status members of the peer-to-peer support community with asking members of the peer-to-peer support community, the defined context criteria at least including a criterion that a match occurs between one or more active status members of the peer-to-peer support community when those matched active status members are currently interacting with the same data entry field of the financial management application program as an asking member of the peer-to-peer support community;

determining, for each active status member interacting with a data entry field, which data entry field that active status member is currently interacting with;

generating context criteria data representing the context criteria for each active status member of the peer-to-peer support community, the generated context criteria data at least including a data entry field each active status member is currently interacting with;

developing, from a complete set of active status members of the support community, one or more sub-sets of active status members sharing a context criterion which at least includes currently interacting with the same data entry field of the application program as an asking member of the peer-to-peer support community;

continuously automatically updating the context criteria data of each active status member to reflect current context criterions of each user, the context criterion data at least including data entry fields that each active status member is currently interacting with;

continuously updating the one or more sub-sets based on a current context criteria data of each active status member and whether users of a given sub-set are interacting with a same data entry field of the application program;

determining that a given member of the peer-to-peer support community is an asking member of the peer-to-peer support community in need of support from one or more other active status members of the of the peer-to-peer support community, resulting in a first asking member, the determination including determining that the given member has spent an amount of time within a particular data entry field where that amount of time exceeds a predetermined threshold value;

responsive to determining a first asking member, determining context criteria data of the first asking member at least indicating the data entry field of the application program that the first asking member is currently interacting with;

using the profile data and the context criteria data for each active status member other than the first asking member and the profile data and/or context criteria data for the first asking member of the peer-to-peer support community to match one or more active status members other than the first asking member with the first asking member, wherein a match occurs between one or more active status members and the first asking member at least when those matched active status members share a context criterion, including when the matched active status members are currently interacting with the same data entry field of the application program as the first asking member; and providing the first asking member of the peer-to-peer support community the capability to make contact with one or more of the matched one or more active status members of the peer-to-peer support community through the financial management application program.

2. The method of claim 1 wherein the financial management application program is selected from the group of financial management application programs consisting of:

a computing system implemented tax preparation financial management application program;

a network accessed tax preparation financial management application program;

a web-based tax preparation financial management application program;

a cloud-based tax preparation financial management application program;

a computing system implemented business management financial management application program;

a network accessed business management financial management application program;

a web-based business management financial management application program;

a cloud-based business management financial management application program;

a computing system implemented accounting financial management application program;
a network accessed accounting financial management application program;
a web-based accounting financial management application program;
a cloud-based accounting financial management application program;
a network accessed financial management system;
a web-based financial management system; and
a cloud-based financial management system.

3. The method of claim 1 wherein only members of the peer-to-peer support community for the financial management application program are provided the capability to access the dynamic expertise and context based peer-to-peer customer support system within the financial management application program.

4. The method of claim 1 wherein the profile data for each member of the peer-to-peer support community is obtained from a source of profile data for each member of the peer-to-peer support community selected from the group of profile data for each member of the peer-to-peer support community sources consisting of:
data in the financial management application program indicating previous interactions with the financial management application program by the member of the peer-to-peer support community;
data provided by the member of the peer-to-peer support community;
data provided by members of the peer-to-peer support community other than the member of the peer-to-peer support community; and
geographic location data associated with the member of the peer-to-peer support community.

5. The method of claim 1 wherein the status data associated with a member of the peer-to-peer support community can be changed by the member of the peer-to-peer support community at any time.

6. The method of claim 1 wherein the status data associated with a member of the peer-to-peer support community is changed based on a recent level of interaction of the member of the peer-to-peer support community with the financial management application program.

7. The method of claim 1 wherein the context criteria indicating a context in which to match active status members of the peer-to-peer support community with asking members of the peer-to-peer support community further includes one or more criteria selected from the group of criteria consisting of:
the criterion that the active status members of the peer-to-peer support community be currently interacting with the same application of the financial management application program as the asking members of the peer-to-peer support community;
the criterion that the active status members of the peer-to-peer support community be currently interacting with the same module of the financial management application program as the asking members of the peer-to-peer support community;
the criterion that the active status members of the peer-to-peer support community be currently interacting with a designated application of the financial management application program;
the criterion that the active status members of the peer-to-peer support community be currently interacting with a designated module of the financial management application program;
the criterion that the active status members of the peer-to-peer support community be currently interacting with a designated data entry field of the financial management application program;
the criterion that the active status members of the peer-to-peer support community be in the same geographic location as the asking members of the peer-to-peer support community; and
the criterion that the active status members of the peer-to-peer support community be in a designated geographic location.

8. The method of claim 1 wherein the determination that a given member of the peer-to-peer support community is an asking member of the peer-to-peer support community is made based on a question being submitted by the member of the peer-to-peer support community.

9. The method of claim 1 wherein providing the asking member of the peer-to-peer support community the capability to make contact with one or more of the matched one or more active status members of the peer-to-peer support community through the financial management application program includes providing the asking member of the peer-to-peer support community one or more communication mechanisms selected from the group of communication mechanisms consisting of:
e-mail;
text message;
video conference;
a hosted forum; and
a question and answer database.

10. The method of claim 9 wherein the one or more communication mechanisms are provided to the asking member of the peer-to-peer support community within the financial management application program and within the current location of the asking member of the peer-to-peer support community within the financial management application program.

11. A method comprising:
providing a tax preparation financial management application program to two or more users;
providing one or more users of the tax preparation financial management application program the opportunity to participate as members of a peer-to-peer support community for the tax preparation financial management application program, wherein the peer-to-peer support community is provided within the provided tax return preparation financial management application program;
obtaining profile data for members of the peer-to-peer support community, the profile data indicating areas of tax expertise associated with the members of the peer-to-peer support community;
providing members of the peer-to-peer support community the capability to provide status data of the members of the peer-to-peer support community, the status data indicating an active current status or inactive current status;
determining, for each active status member interacting with a module of the tax preparation financial management application program, which module that active status member is currently interacting with;
generating context criteria data representing a location within the financial management application program where the active status members of the peer-to-peer support community are interacting with the tax preparation financial management application program for each active status member of the peer-to-peer support community, the generated context criteria including data representing a module of the tax preparation financial management application program that each respective active status member is currently interacting with;

determining that a given member of the peer-to-peer support community is an asking member of the peer-to-peer support community in need of support from one or more active status members of the of the peer-to-peer support community other than the member, resulting in the identification of a first asking member;

responsive to the identification of a first asking member, determining context criteria data of the first asking member indicating a module of the tax preparation financial management application program that the first asking member is currently interacting with;

using the profile data and the context criteria data for each active status member other than the first asking member and the profile data and/or context criteria data for the first asking member to match one or more active status members of the peer-to-peer support community with the asking member of the peer-to-peer support community, wherein a match occurs between one or more active status members of the peer-to-peer support community and the first asking member at least when those matched active status members are currently interacting with the same module of the financial management application program as the first asking member; and providing the first asking member of the peer-to-peer support community the capability to make contact with one or more of the matched one or more active status members of the peer-to-peer support community through the tax preparation financial management application program.

12. The method of claim 11 wherein the tax preparation financial management application program is selected from the group of tax preparation financial management application programs consisting of:
 a computing system implemented tax preparation financial management application program;
 a network accessed tax preparation financial management application program;
 a web-based tax preparation financial management application program; and
 a cloud-based tax preparation financial management application program.

13. The method of claim 11 wherein only members of the peer-to-peer support community for the tax preparation financial management application program are provided the capability to access the dynamic expertise and context based peer-to-peer customer support system within the tax preparation financial management application program.

14. The method of claim 11 wherein the profile data for each member of the peer-to-peer support community is obtained from a source of profile data for each member of the peer-to-peer support community selected from the group of profile data for each member of the peer-to-peer support community sources consisting of:
 data in the tax preparation financial management application program indicating previous interactions with the tax preparation financial management application program by the member of the peer-to-peer support community;
 data provided by the member of the peer-to-peer support community;
 data provided by members of the peer-to-peer support community other than the member of the peer-to-peer support community; and
 geographic location data associated with the member of the peer-to-peer support community.

15. The method of claim 11 wherein the status data associated with a member of the peer-to-peer support community can be changed by the member of the peer-to-peer support community at any time.

16. The method of claim 11 wherein the status data associated with a member of the peer-to-peer support community is changed based on a recent level of interaction of the member of the peer-to-peer support community with the tax preparation financial management application program.

17. The method of claim 11 wherein the context criteria data represents one or more criterion selected from the group of criterion consisting of:
 the criterion that the active status members of the peer-to-peer support community be currently interacting with the same tax preparation application as the asking members of the peer-to-peer support community;
 the criterion that the active status members of the peer-to-peer support community be currently interacting with the same data entry field of the tax preparation financial management application program as the asking members of the peer-to-peer support community;
 the criterion that the active status members of the peer-to-peer support community be currently interacting with a designated tax preparation application of the tax preparation financial management application program;
 the criterion that the active status members of the peer-to-peer support community be currently interacting with a designated module of the tax preparation financial management application program
 the criterion that the active status members of the peer-to-peer support community be currently interacting with a designated data entry field of the tax preparation financial management application program;
 the criterion that the active status members of the peer-to-peer support community be in the same geographic location as the asking members of the peer-to-peer support community; and
 the criterion that the active status members of the peer-to-peer support community be in a designated geographic location.

18. The method claim 11 wherein the determination that a given member of the peer-to-peer support community is an asking member of the peer-to-peer support community is made based on a question being submitted by the member of the peer-to-peer support community.

19. The method of claim 11 wherein the determination that a given member of the peer-to-peer support community is an asking member of the peer-to-peer support community is made based on how long the member of the peer-to-peer support community has spent interacting with the same module of the tax preparation financial management application program.

20. The method of claim 11 wherein providing the asking member of the peer-to-peer support community the capability to make contact with one or more of the matched one or more active status members of the peer-to-peer support community through the tax preparation financial management application program includes providing the asking member of the peer-to-peer support community one or more communication mechanisms selected from the group of communication mechanisms consisting of:

e-mail;

text message;

video conference;

a hosted forum; and a question and answer database.

21. The method of claim 20 wherein the one or more communication mechanisms are provided to the asking member of the peer-to-peer support community within the tax preparation financial management application program and within the current location of the asking member of the peer-to-peer support community within the tax preparation financial management application program.

22. A method comprising:

providing a financial management application program to one or more users;

providing one or more users of the financial management application program the opportunity to participate as members of a peer-to-peer support community for the financial management application program, wherein functionality pertaining to the peer-to-peer support community is provided within the provided financial management application program;

obtaining profile data for each member of the peer-to-peer support community, the profile data indicating areas of expertise associated with each member of the peer-to-peer support community;

receiving from members of the peer-to-peer support community status data indicating an active current status or inactive current status;

defining one or more context criteria indicating a context in which to group active status members of the peer-to-peer support community with asking members of the peer-to-peer support community, the defined context criteria including at least grouping active status members that are currently interacting with a same data entry field of the financial management application program;

determining, for each active status member interacting with a data entry field of the tax preparation financial management application program, which data entry field that active status member is currently interacting with;

generating context criteria data representing the context criteria for active status members of the peer-to-peer support community, the generated context criteria data at least including a data entry field each active status member is currently interacting with;

developing, from active status members of the support community, one or more sub-sets of active status members sharing a context criterion;

continuously automatically updating the context criteria data of each active status member to reflect current context criterions of each user, the context criterion data at least including data entry fields that each active status member is currently interacting with;

continuously updating the one or more sub-sets based on a current context of each active status member and whether users of a given sub-set are interacting with a same data entry field of the application program;

using the profile data and the context criteria data sub-set to identify one or more of the previously determined sub-sets who are currently interacting with the same data entry field of the financial management application program;

providing each given active status members of each sub-set who are interacting with the same data field of the financial management application program as the given active status member a listing of other active status members of the sub-set of active status members of the identified one or more sub-sets; and providing each member of each sub-set of active status members of the peer-to-peer support community who share a common context the capability to make contact with the other members of the sub-set of active status members of the peer-to-peer support community who share a common context through the financial management application program.

23. The method of claim 22 wherein the financial management application program is selected from the group of financial management application programs consisting of:

a computing system implemented tax preparation financial management application program;

a network accessed tax preparation financial management application program;

a web-based tax preparation financial management application program;

a cloud-based tax preparation financial management application program;

a computing system implemented business management financial management application program;

a network accessed business management financial management application program;

a web-based business management financial management application program;

a cloud-based business management financial management application program;

a computing system implemented accounting financial management application program;

a network accessed accounting financial management application program;

a web-based accounting financial management application program;

a cloud-based accounting financial management application program;

a computing system implemented financial management system;

a network accessed financial management system;

a web-based financial management system; and a cloud-based financial management system.

24. The method of claim 22 wherein only members of the peer-to-peer support community for the financial management application program are provided the capability to access the dynamic expertise and context based peer-to-peer customer support system within the financial management application program.

25. The method of claim 22 wherein the profile data for each member of the peer-to-peer support community is obtained from a source of profile data for each member of the peer-to-peer support community selected from the group of profile data for each member of the peer-to-peer support community sources consisting of:

data in the financial management application program indicating previous interactions with the financial management application program by the member of the peer-to-peer support community;

data provided by the member of the peer-to-peer support community;

data provided by members of the peer-to-peer support community other than the member of the peer-to-peer support community; and geographic location data associated with the member of the peer-to-peer support community.

26. The method of claim 22 wherein the status data associated with a member of the peer-to-peer support community can be changed by the member of the peer-to-peer support community at any time.

27. The method of claim 22 wherein the status data associated with a member of the peer-to-peer support community is changed based on a recent level of interaction of the member of the peer-to-peer support community with the financial management application program.

28. The method of claim 22 wherein the context criteria include one or more criteria selected from the group of criteria consisting of:
- the criterion that the active status members of the peer-to-peer support community included in a sub-set of active status members of the peer-to-peer support community be currently interacting with the same application of the financial management application program;
- the criterion that the active status members of the peer-to-peer support community included in a sub-set of active status members of the peer-to-peer support community be currently interacting with the same data entry field of the financial management application program;
- the criterion that the active status members of the peer-to-peer support community included in a sub-set of active status members of the peer-to-peer support community be currently interacting with a designated application of the financial management application program;
- the criterion that the active status members of the peer-to-peer support community included in a sub-set of active status members of the peer-to-peer support community be currently interacting with a designated module of the financial management application program;
- the criterion that the active status members of the peer-to-peer support community included in a sub-set of active status members of the peer-to-peer support community be currently interacting with a designated data entry field of the financial management application program;
- the criterion that the active status members of the peer-to-peer support community included in a sub-set of active status members of the peer-to-peer support community be in the same geographic location; and
- the criterion that the active status members of the peer-to-peer support community included in a sub-set of active status members of the peer-to-peer support community be in a designated geographic location.

29. The method of claim 22 wherein providing each member of each sub-set of active status members of the peer-to-peer support community who share a common context the capability to make contact with the other members of the sub-set of active status members of the peer-to-peer support community who share a common context through the financial management application program includes providing one or more communication mechanisms selected from the group of communication mechanisms consisting of:
- e-mail;
- text message;
- video conference;
- a hosted forum; and
- a question and answer database.

30. The method of claim 29 wherein the one or more communication mechanisms are provided within the financial management application program and within the current location of the members of the sub-set of active status members of the peer-to-peer support community who share a common context within the financial management application program.

* * * * *